US009135731B2

(12) United States Patent
Lauenstein et al.

(10) Patent No.: US 9,135,731 B2
(45) Date of Patent: Sep. 15, 2015

(54) SYSTEMS, DEVICES, METHODS FOR SENSING AND PROCESSING FISHING RELATED DATA

(71) Applicant: Navico Holding AS, Egersund (NO)

(72) Inventors: Michael Lauenstein, Eagan, MN (US); Matthew Johnson, Roseville, MN (US); Shawn McCutcheon, White Bear Lake, MN (US)

(73) Assignee: Navico Holding AS, Egersund (NO)

( * ) Notice: Subject to any disclaimer, the term of this patent is extended or adjusted under 35 U.S.C. 154(b) by 289 days.

(21) Appl. No.: 13/780,298

(22) Filed: Feb. 28, 2013

(65) Prior Publication Data

US 2014/0071167 A1   Mar. 13, 2014

Related U.S. Application Data

(62) Division of application No. 12/784,138, filed on May 20, 2010, now abandoned.

(60) Provisional application No. 61/180,409, filed on May 21, 2009.

(51) Int. Cl.
| | |
|---|---|
| *G01S 15/00* | (2006.01) |
| *G06T 11/20* | (2006.01) |
| *G01S 15/96* | (2006.01) |
| *G01S 7/00* | (2006.01) |
| *G01S 7/539* | (2006.01) |
| *G06T 17/05* | (2011.01) |

(52) U.S. Cl.
CPC ............... *G06T 11/206* (2013.01); *G01S 7/003* (2013.01); *G01S 7/539* (2013.01); *G01S 15/96* (2013.01); *G06T 17/05* (2013.01)

(58) Field of Classification Search
USPC .......................................................... 367/99
See application file for complete search history.

(56) References Cited

U.S. PATENT DOCUMENTS

| | | | |
|---|---|---|---|
| 3,752,431 | A | 8/1973 | McBride |
| 4,047,147 | A | 9/1977 | Wood et al. |
| 4,281,404 | A | 7/1981 | Morrow, Jr. et al. |
| 4,282,590 | A | 8/1981 | Wingate |
| 4,829,493 | A | 5/1989 | Bailey |
| 4,879,697 | A | 11/1989 | Lowrance et al. |
| 4,995,010 | A | 2/1991 | Knight |
| 5,253,220 | A | 10/1993 | Wilson, Sr. |
| 5,524,637 | A | 6/1996 | Erickson |
| 6,222,449 | B1 | 4/2001 | Twining |
| 6,595,315 | B1 | 7/2003 | Fujimoto et al. |

(Continued)

*Primary Examiner* — James Hulka
(74) *Attorney, Agent, or Firm* — Kinney & Lange, P.A.

(57) ABSTRACT

Devices and systems for noninvasively and nondestructively sensing a signal in an electrical outdoor device, such a fishing transponder, are described. The device can include a first electrical connection to connect to a port on a main unit of an echo-location device, a second electrical connection to connect to a port on a transponder, the second electrical connection being in bi-directional electrical communication with the first connection to send a power signal from the main unit to the transponder and return an echoed signal to the main unit, and a third electrical connection to sense the signals between the first electrical connection and the second electrical connection. Positioning data is also created and stored with the signal data. The positioning data can be used to control acquisition of data. Systems and methods for processing the sensed data are described. Reports can be generated using the data and, in some reports with the positioning data.

19 Claims, 15 Drawing Sheets

(56) References Cited

U.S. PATENT DOCUMENTS

| | | |
|---|---|---|
| 6,628,569 B1 | 9/2003 | Steiner et al. |
| 7,161,872 B2 | 1/2007 | Kuriyama et al. |
| 7,224,642 B1 | 5/2007 | Tran |
| 7,236,426 B2 | 6/2007 | Turner et al. |
| 8,417,451 B2 | 4/2013 | Hersey et al. |
| 2004/0097802 A1 | 5/2004 | Cohen |
| 2004/0249860 A1 | 12/2004 | Stechschulte et al. |
| 2005/0162976 A1 | 7/2005 | Kuriyama et al. |
| 2005/0211812 A1 | 9/2005 | Nakagawa et al. |
| 2006/0018197 A1 | 1/2006 | Burczynski et al. |
| 2006/0050613 A1 | 3/2006 | Turner |
| 2007/0025591 A1* | 2/2007 | Rhoads et al. ............... 382/100 |
| 2007/0223310 A1 | 9/2007 | Tran |
| 2008/0080317 A1 | 4/2008 | Inouchi et al. |
| 2010/0036880 A1* | 2/2010 | Carpenter ............... 707/104.1 |

* cited by examiner

SYSTEMS, DEVICES, METHODS FOR SENSING AND PROCESSING FISHING RELATED DATA This application is a divisional of U.S. patent application Ser. No. 12/784,138 filed on 20 May 2010, titled SYSTEMS, DEVICES, METHODS FOR SENSING AND PROCESSING FISHING RELATED DATA, which claims benefit and priority to U.S. Provisional Patent Application Ser. No. 61/180,409, filed on 21 May 2009, titled SYSTEMS, DEVICES, METHODS FOR SENSING AND PROCESSING FISHING RELATED DATA, which both applications are incorporated by reference in their entirety for any purpose.

FIELD OF THE INVENTION

The present disclosure relates to systems, devices and methods for sensing characteristics of a body of water, and more specifically, to a device to sense water characteristics or fishing data, to report sensed data to a remote location, and to provide reports using the sensed data.

BACKGROUND

The fishing industry has over $42 billion dollars in annual expenditures in the US alone and an estimated 30 million participants. Anglers in the United States spend an average of 566 million days of total fishing on the water. Many anglers are willing to invest in new technologies to enhance their fishing experience by providing tools to more efficiently use their recreational time.

An apparatus for collecting, storing and transmitting fishing information is described in U.S. Patent Publication No. 2004/0249860. Its Abstract states a system for collecting, storing, processing and transmitting fishing or other sport information includes a data logging and processing module and connected sensors for automatically collecting data during participation in the sport. A data communication module collects data input by the user. Data from both modules is input into a personal computer connected to a web site that uses the data from the modules and collected related data to provide a virtual guide service.

A fishing data display device is described in U.S. Pat. No. 7,161,872. Its Abstract states a fish depth monitor is a device that can display first water depth data that indicates the location of terminal tackle that is engaged on fishing line reeled out from a spool, and second water depth data that indicates the location of the bottom of a fishing location transmitted from a fish finder, and includes a case, first and second reception portions, a display unit, and a control unit. The first and second reception portions receive the first water depth data from an electric driven reel and the second water depth data from the fish finder. The control unit graphically displays the received first and second water depth data in positions that correspond to the water depth on the display unit. It is possible to intuitively determine the positional relationship between the location of the terminal tackle and the location of the bottom.

Integrated mapping and audio systems are described in U.S. Pat. No. 7,236,426. Its Abstract states an integrated position mapping system and an integrated sonar mapping system both permit recording, storage and playback of audio data. Audio data is provided to the integrated sonar mapping system or the integrated position mapping system so that it may be correlated to position data or echo data. The integrated sonar mapping system includes a sonar transducer for emitting and receiving sonar signals that may be subsequently be processed to provide echo data from objects in the water which reflect sonar signals. The integrated position mapping system includes a position receiver for providing position data. A controller not only processes the data for storage, but also correlates the audio data to echo data or position data. The correlated data may therefore be retrieved for playback of the audio data and display of the position data or echo data.

A remote fish logging unit is described in U.S. Pat. No. 6,222,449. Its Abstract states a portable recording device, namely a remote logging unit, for electronically recording relevant information related to fishing conditions, and the like. The recording device has sensors for detecting environmental conditions and/or for measuring physical data on a specimen caught. The device also includes input mechanisms, such as a touch screen, for manually entering information, and a display for reviewing information stored in the device's memory. The recording device may be connectable to a personal computer for creating a personal log of the user's activities and/or for loading additional information into the device. The device may transfer recorded data to a central repository, for example using a transmitter/receiver for sending a data signal to a network server which maintains a database of information related to fishing conditions at a number of locations. The network server may receive and compile information from a number of remote units at various locations, thereby providing a system for sharing such information. A remote unit may contact the server from a remote location and request information on fishing conditions for a selected location.

BRIEF DESCRIPTION OF THE DRAWINGS

Example embodiments are illustrated by way of example and not limitation in the figures of the accompanying drawings, in which like references indicate similar elements and in which.

DETAILED DESCRIPTION

Examples of the systems, methods, and devices described herein can process outdoor related data, e.g., fishing and/or aquatic data. Raw data can be produced by sonar equipment on boats. In an example, the data is from the numerous private boats sailing on the waterways. Many boats include sonar systems and an example of the present invention can sense the signals being produced by the sonar system to save the data. The data can be sensed without interfering with the signals traversing the communication paths of the sonar system. Thereafter, the data can be loaded to more powerful computing system to apply stored instructions to the data to produce meaningful reports for a user. These reports can be private to the user or can be sold to other users.

Figure 1:
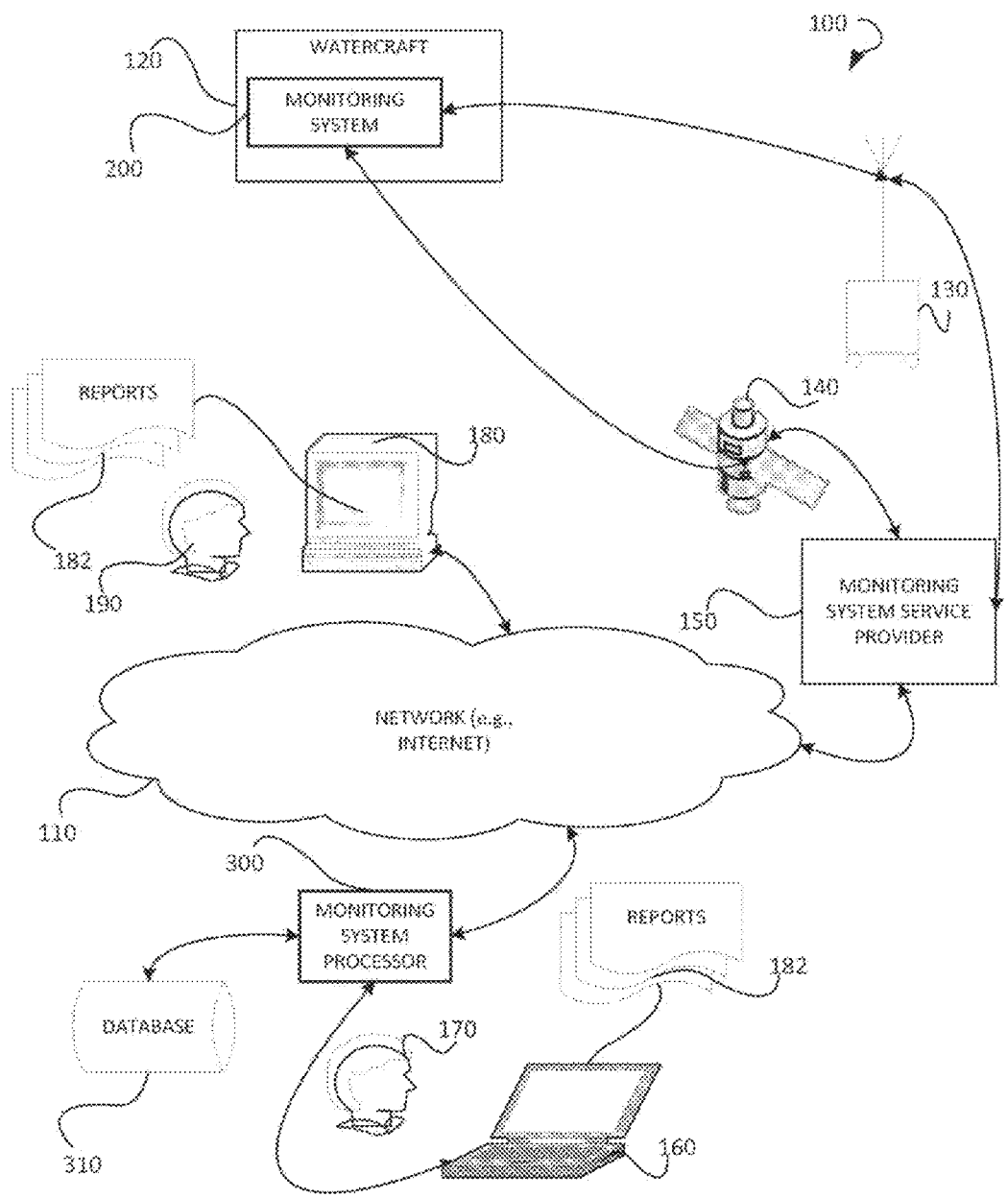
FIG. 1 is a block diagram showing architecture within which information reporting is implemented, in accordance with an example embodiment of the present invention.

FIG. 1 illustrates an example environment 100, within which information reporting can be implemented. As shown in FIG. 1, the example environment 100 comprises a watercraft 120, which can, in turn, include an installed monitoring system 200. The monitoring system 200 can collect, store, receives, transmits, and possibly processes various information related to the positional and operational data of the watercraft 120 and characteristics of the body of water, such as an ocean, sea, lake, river, stream, canal, or pond on which the watercraft is travelling. The monitoring system 200 can integrate a sounding device, a GPS transceiver, cellular/satellite transceiver, local wireless technology, memory devices, and/or various computing technologies into a single mobile positioning, sensing, and communication system. The monitoring system 200 can send position coordinates, such as GPS data coordinates and sensor events, as well as other messages from the water monitor 120 to monitoring system service provider 150 running software specifically designed to process this type of information. The monitoring system 200 can send raw information from regarding water, environment, and/or fishing to the monitoring system provider 150. In an example, the monitoring system 200 can process information and make decisions on intelligent reporting of data that is to be collected and reported. The monitoring system 200 can also receive messages sent from the monitoring system service provider 150. In an example, the monitoring system 200 includes a memory device that can store the sensed data.

The environment 100 can include a satellite network 140 and/or a cellular network 130, both of which can be utilized for transmitting and receiving positional, sensed, and operational data to the monitoring system 200. The network 130 can also be a short range wireless network used by computer systems. The satellite network 140 and/or the cellular network 130 can also receive and transmit the positional, sensed, and operational data from a monitoring system service provider 150. The monitoring system service provider 150 can include dedicated circuitry or a general purpose computer configurable to make the information collected at the monitoring system 200 available through an open architecture interface, such as an Application Programming Interface (API). The environment 100 can also include an electronic network 110, for example, a computer network. The network 110 can be a network of data processing nodes that are interconnected for the purpose of data communication (e.g., a global computer network, such as the Internet). In an example, the memory device of the monitoring system 200 connected to at least one of the satellite network 140 and cellular network 130 to upload the stored data.

The monitoring system provider 150 is communicatively coupled to the network 110. A monitoring system processor 300, illustrated within the environment 100, can be communicatively coupled to the network 110 as well. The monitoring system processor 300 can be utilized to access and pull the positional and operational data associated with the watercraft 120 as well as sensed data via the open architecture interface. The monitoring system processor 300 can communicate with the memory of the system 200 to retrieve the data. Various communication protocols (e.g., Web Services and cellular communications) can be utilized in the communications occurring between the monitoring system processor 300 and the monitoring system service provider 150. The monitoring system service provider 150 can utilize telematics and intelligent data processing as well as software to make the information available via the network 110.

While illustrated as two separated systems, in an example, the monitoring system 200 and the monitoring system processor 300 can be integrated and communication between the two systems occur as the environment around a watercraft is being monitored.

The monitoring system processor 300 can be communicatively coupled to a database 310, in which the monitoring system processor 300 may periodically store results after processing of the information received from the monitoring system provider 150. In an example, the database 310 is a centralized behavioral and geo-mapping database. The monitoring system processor 300 can include various modules, discussed in more detail below with reference to FIG. 3. The modules of the monitoring system processor 300 can be utilized to perform various operations to transform the data into useful information regarding the body of water, including, but not limited to, fishing information. This useful information can be provided back to the owner of watercraft through a variety of media, including, but not limited to, interactive media, computer systems, electronic networks etc.

The monitoring system processor 300 can apply rules to the stored data to interpret the data into useful information, e.g., reports 182. The rules can be stored in machine readable formats, e.g., magnetic media, optical media, electrical media. In an example, the database 310 stores the rules. The rule application can be performed automatically. The monitoring system processor 300 is optionally associated with an operator 170 operating the monitoring system processor 300 via a computer 160. The computer 160 can include a Graphical User Interface (GUI) facilitating display and manipulation of the monitoring system processor 300. The computer 160 can also enable the operator 170 to view and manipulate reports 182 that can be used to manage and monitor one or more of the physical qualities of a body of water that is associated with the watercraft and/or an authorized user. The monitor can be remote and the graphics being displayed can be over a computer network. In an example, the reports and data can be sent through the monitoring system service provider to the watercraft 120 or to another location as designated by the user The authorized user can receive real-time reports related to the data regarding a body of water such as contour maps, travel, past performance, and location. Using a report as a detailed map view, the authorized user can see up-to-date data related to body of water or the fishing excursion. The map view can also show data that has been interpreted by the processor. The reports 182 can include an overview report for a body of water. The overview report, for example, can detail one or more of weed beds, bottom composition and structure, fish, depth, density and bait fish. The reports 182 can include a time report. The time report, for example, can detail any of the measured or derived characteristics as a function of time. The reports 182 can also include a hazard report. The hazard report can include information regarding hazards in the body of water. The reports 182 can also include a fish report. The fish report can include fish population information as well as local fishing restrictions. The reports can include a trip tracking report, which includes the course of the watercraft during one or more excursions on a body of water.

The monitoring system processor 300 can provide the reports 182 to an authorized user 190 via the network 110. The authorized user 190 can view the reports 182 using a general purpose computer 180 or any other device providing an ability to view the reports 182. In some example embodiments, the monitoring system processor 300 can send copies of the reports 182 to the authorized user 190 attached or embedded in a body of an electronic email. The reports 182 can also be provided or applications on mobile communication devices. The reports 182 are based on the information initially provided by the monitoring system 200. The monitoring system 200 is described by way of example with reference to FIG. 2.

In various examples, the computing devices 160, 180 are mobile telephones that run applications on which data from the monitoring system processor 300 can be displayed. In an example, the device, 160 or 180 is an IPhone™ produced by Apple, Inc. of Cupertino, Calif. The application on device 160, 180 can provide an interface whereby the user 170 or 190, respectively, can request data from the monitoring system processor 300. The processor 300 can format the data and send it to the device 160, 180 for display. The application on the device 160,180 can be interactive with the data to provide different views and change graphics at the request of the user.

Data communication as described in FIG. 1 couples the various devices together. The network 110 is preferably the Internet, but can be any electronic communication network capable of communicating data between devices, which can be used with the present system. In addition to the Internet, suitable networks can also include or interface with any one or more of, for instance, an local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications can also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

Figure 2:
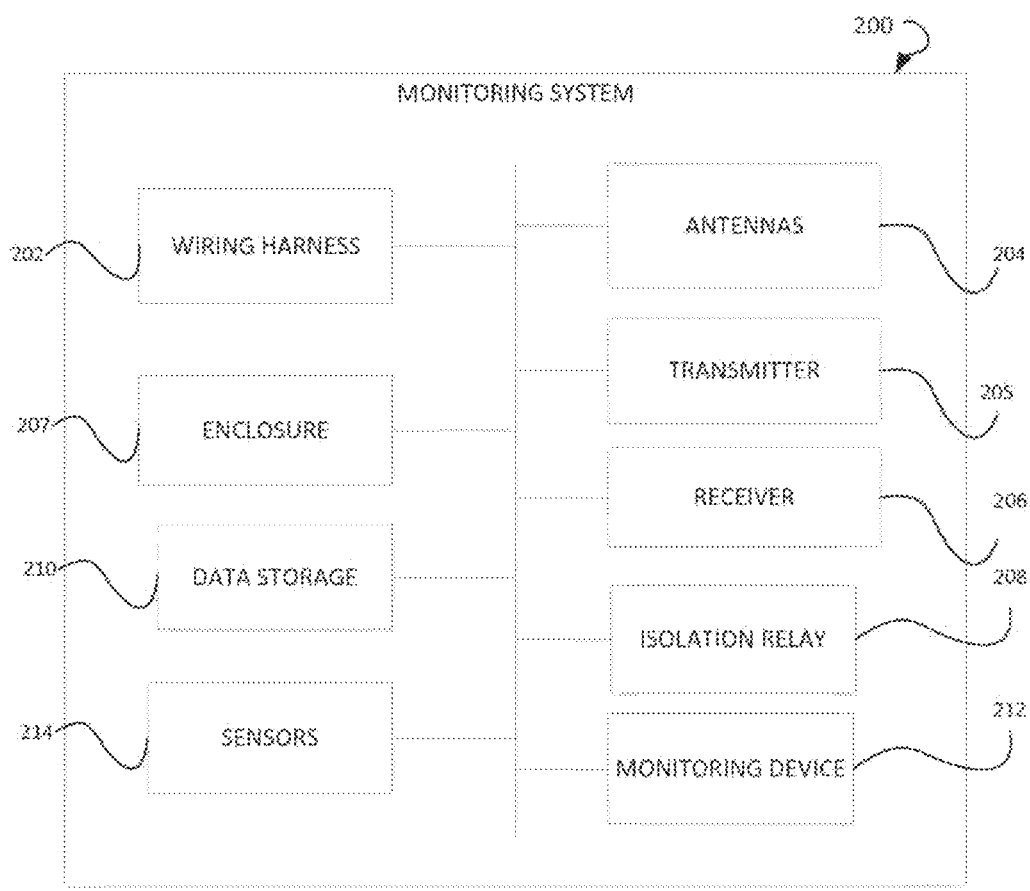
FIG. 2 is a block diagram showing a monitoring system, in accordance with an example embodiment of the present invention.

FIG. 2 is a block diagram showing a monitoring system 200, in accordance with an example embodiment. The monitoring system 200 can include a wiring harness 202, an antenna 204, a transmitter 205, a receiver 206, an enclosure 207, an isolation relay 208, data storage 210, a monitoring device 212, and sensors 214. The monitoring system 200 can be a stand-alone component utilized to determine data regarding the body of water and/or the water craft and communicate the data. The data can include watercraft data such as, but not limited to position, speed, and direction. The data can include time and date. The data can include sonar data. The monitoring system 200 can also interface with other sensors 214 and external accessories as part of an on-board system. Events being monitored include an ignition status, a distance moved since last manual update, a time elapsed since manual update, number of fish caught, type of fish caught, size of fish caught, and other data that can be entered by the angler.

The transmitter 205 and the receiver 206 are electrically connected to the antenna 204 for respectively sending and receiving over the air electromagnetic signals. The transmitter 205 includes electronic circuits to receive an input signal from the antenna 204. The transmitter 205 can include a power supply, an oscillator, a modulator, and amplifiers for specific frequencies. The modulator adds signal information onto a carrier frequency, which is then broadcast from the antenna 204. The receiver 206 can include electronic filters to separate a desired radio signal from noise and other signals sensed by the antenna 204. The receiver 206 amplifies the desired signal to a level suitable for further electronic processing, e.g., demodulation and decoding, and signal processing. While the transmitter 205 and the receiver 206 are shown as separate devices in FIG. 2, it will be recognized that a transceiver, a device that includes circuits for both sending and receiving is within the scope of the present disclosure.

The monitoring device 212 can include firmware, which supports automated monitoring and reporting of signals passing through the system 200 from a sensing device to the display device on the watercraft. The monitoring device 212 can detect a signal without degrading the signal so that it is not usable as intended. In an example, the monitoring device 212 non-invasively senses the signal. In an example, the monitoring device 212 duplicates the signal and amplifies the signals for both its use and for passing the original signal to it subsequent destination. The signal sensed by monitoring device 212 can be sent via transmitter 205, which cause the antenna 204 to broadcast the signal to the monitoring system provider 150. Information related to other events can be detected, stored, and transmitted by the monitoring device 212. The monitoring device 212 can automatically report data relating to the signal. In an example, the monitoring device 212 can also record the signal in the data storage 210 for later transmission. The monitoring system 200 or just the monitoring device 212 can be mounted intermediate the sensor and the on-board display.

The monitoring device 212 can include processors that execute applications, which are instructions stored on computer readable media. The local processing capability of the monitoring can perform simple and complex logic, including but not limited to, power management, communication management, data storage, encrypted communication, and/or real time clock processing and management.

The wiring harness 202 includes, in an example, a string of cables and/or wires, which transmit electrical signals or operating currents between other components. By binding wires and cables into a cable harness, the wires and cables are secured against the adverse effects of vibrations, abrasions, and moisture. By constricting the wires into a non-flexing bundle, usage of space is optimized and the risk of a short circuit is decreased. The wires bundled in the wiring harness 202 can be connected to various parts of the watercraft 120 to transmit various signals from sensor 214 to the antenna or through the wiring harness 202.

The sensors 214 can be installed at various locations of the watercraft 120. The sensors 214 can measure positioning of the watercraft, weather, light conditions, date, temperature (air and water), imagers, air pressure, etc. To communicate the sensed data to the monitoring device 212, the sensors 214 can also utilize short range radio communications protocol (e.g., IEEE 802.15.4 or other short range wireless technologies) or communicate over a wired connection.

All of the example components of the monitoring system 200 can be provided inside an enclosure 207. The enclosure 207 is, in an example, a metal housing that is sealed against dirt, grime, dust, and moisture that are generated outdoors and on watercraft. It will be noted that the monitoring system 200 is not bound to a particular monitoring system provider. Any hardware that can successfully interface with the monitoring system 200 can be utilized as the monitoring system provider 150. In an example, the enclosure is water-proof, e.g., able to withstand water pressure down to 10 meters, 50 meters, or 100 meters. The monitoring system 200 can, in some example embodiments, be specifically designed for the watercraft 120 or for a specific transponder/display combination.

Figure 3:
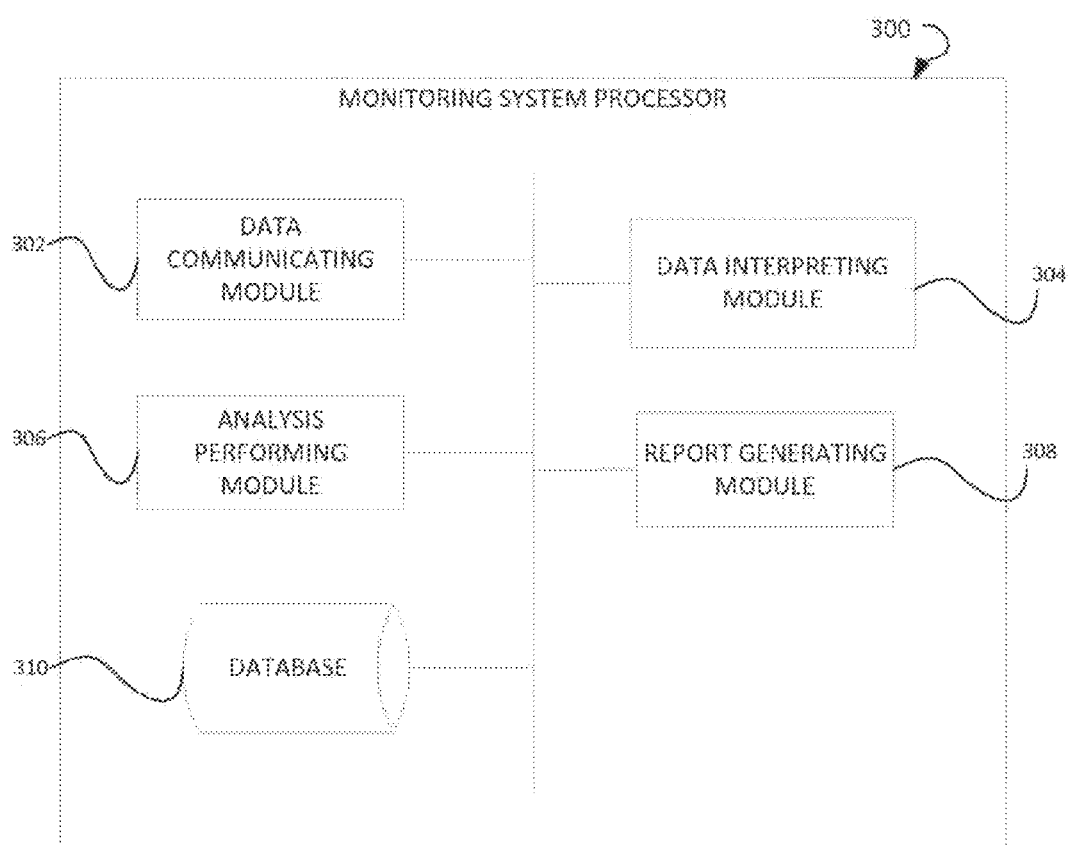
FIG. 3 is a block diagram showing a monitoring system processor, in accordance with an example embodiment of the present invention.

FIG. 3 is a block diagram showing a monitoring system processor 300, in accordance with an example embodiment. The monitoring system processor 300 can include, in some example embodiments, a data communication module 302, a data interpreting module 304, an analysis performing module 306, a report generator module 308, and the database 310. The operations of the modules and the monitoring system processor 300 are explained in more detail within the context of an example method for information reporting as described herein. Modules, in an example, include electronic circuits that can be dedicated to specific tasks by virtue of the electrical connections and instructions that can be loaded into the hardware. In an example, the monitoring system processor 300 is adapted to provide reports via web or computer network applications that have some of the characteristics of desktop applications. These web applications can be delivered by way of a web browser plug-ins. In an example, the monitoring system processor 300 is adapted to provide reports via mobile phone applications.

Figure 4:
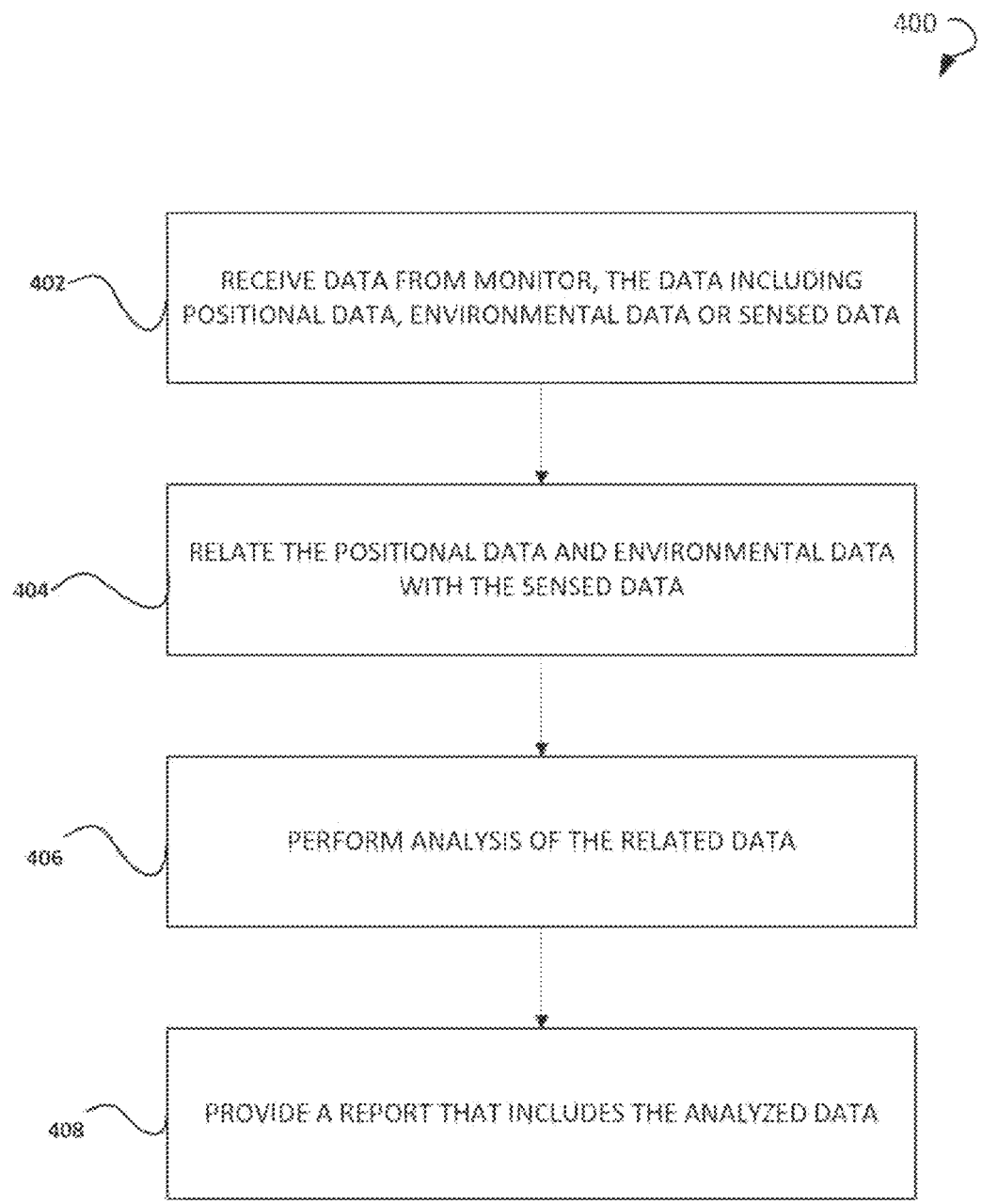
FIG. 4 is a flow diagram showing a method according to an example embodiment.

FIG. 4 is a process flow diagram illustrating a method for information reporting 400, in accordance with an example embodiment. The method 400 can be performed by processing logic that can comprise hardware (e.g., dedicated logic, programmable logic, microcode, etc.), software (such as software (instructions that turn a general purpose computing machine into a specific purpose machine) run on a general purpose computer system or a dedicated machine), or a combination of both. In one example embodiment, the processing logic resides at the monitoring system processor 300, illustrated in FIG. 3. The method 400 can be performed by the various modules discussed above with reference to FIG. 3. Each of these modules can include processing logic that can be embodied in electrical circuits.

As shown in FIG. 4, the method 400 can commence at operation 402 with the data communication module 302 receiving data related to the operation of the watercraft 120, environmental data, water data, or the sensed data from the monitoring system. The data received by the communication module 302 can include the positional and operational data associated with the watercraft 120 or sensed data related to the environment around the watercraft or to sensed data relating to the body of water. The positional data can be obtained using the Global Positioning System (GPS) or a cellular triangulation system by the monitoring system 200 installed on the watercraft 120 and transmitted to the monitoring system provider 150. The data can be made available over a network from the monitoring system service provider 150 using an appropriate protocol (e.g., Web Services).

Examples of watercraft operational data include, but are not limited to, velocity, direction, an ignition key ON event, an ignition key OFF event, fish caught event, kept fish event, "throw-back" fish event, a location, a fuel efficiency (e.g., fuel burn calculation), an idle time, trolling time, a fishing production statistics, a watercraft preventive maintenance schedule, and a watercraft maintenance history. Sensed data can include weather data, time and date data, transponder settings data, depth data, broadcast signal data, and raw return signal data. Other data of interest is described in U.S. Pat. No. 6,222,449, which is hereby incorporated by reference for any purpose. However, if U.S. Pat. No. 6,222,449 conflicts with the present disclosure, the present disclosure controls interpretation. The data can be received via a network cellular 130 and/or a satellite network 140 at the monitoring system service provider 150 and then pulled by the monitoring system processor 300.

In some examples described above information cannot be transmitted immediately from the monitoring system 200 to the monitoring service provider 150 due to, for example, a temporary unavailability of the satellite 140 and/or the cellular network 130. The monitoring system 200 can store information until communication over one of the networks between the monitoring system 200 and the monitoring system service provider 150 is restored. If the communication is disrupted due to the watercraft 120 moving out of the coverage area, the monitoring system 200 can be removed from the watercraft 120 and brought back into the coverage area. Alternatively, the watercraft 120 can be moved into the coverage area. Once the communications are restored, the monitoring system 200 can transmit information to the monitoring service provider 150. In another example, the data is stored in a mobile memory device, such as portable hard drive, a flash memory device, a thumbdrive, a NOR-type memory device, optical media (e.g., disks), magnetic media (e.g., disks), or other portable machine readable media and connected to a further device that can communicate to the monitoring system processor 300.

At operation 404, the data interpreting module 304 of the monitoring system processor 300 can relate the positional data to the operational data or the body of water data to accurately determine characteristics relating to the excursion. The data interpreting module 304 can also relate the environmental data to the body of water data. Date and time data can be correlated to any of the other received data. At operation 406, the data interpreting module 304 of the monitoring system processor 300 can perform analysis of the related data to provide time and date specific data. The analysis can include trend data and statistics. The trend data can be a map that shows the underwater features of the body of water over time. Additional data can be fishing performance over time and location on the body of water. This data can be computed ahead of time or computed on a real-time basis as requested by a user. The data can also be computed on a site specific basis as a sub-unit of a body of water. In some example embodiments, a relationship between the fishing performance and the site specific data can be included in the reports 182. The computed data can include the performance of an individual angler over a period of time and not site specific. All of the computed data can be stored in the database 310.

The data interpreting module 304 of the monitoring system processor 300 can intelligently interpret the data from the watercraft in view of the operational data. Any event having a low probability of occurring in view of the positional data associated with the watercraft 120 or in view of one or more of other events occurring in the same or nearly the same time, can be eliminated as false. For example, the data analyzing module 306 can determine that at the time of the reported data loading event, the watercraft 120 was not operational or operational for a period of time which is too short for the loading to occur.

Thus, the reported loading event can be evaluate as false, if the data related to the operational status (e.g., motor, or eco-sounding device) shows that the watercraft was still at a start location, such as a dock. In another example embodiment, the data analyzing module 306 can compare the performance data of the watercraft to the positional data to determine whether, at the time of the reported data events, the watercraft was present at a site. In an example, a data collection operator, such as a state or Federal official (Department of Natural Resources, Environmental Protection Agency, Department of Interior, Army Corp. of Engineers, USGS, etc.) or academic may have a watercraft with sensors at a the respective job site. If the watercraft and, hence, sensors, was not present at the respective job site, the reported event can be eliminated as false. In some example embodiments, the data analyzing module 306 can analyze the performance data to ensure that each data event is followed by an appropriate later data event.

At operation 408, a report generating module 308 of the monitoring system processor 300 can provide a report that includes the operational characteristic and the performance output. In some example embodiments, the report can be accessed by an authorized user via a computer interface. In some other example embodiments a digital copy of the report can be sent to a predetermined user via an electronic mail. The report can summarize the performance output of the watercraft 120 or be related to a specific area of operational characteristics. For example, the report can be related to production data associated with the watercaft 120.

Databases, stored at either at the operator's computer 160 or the authorized user's computer 180, as well as the monitoring system database 310 can store the reports generated according to the methods and systems described herein. The databases are stored on tangible, computer readable media, such are magnetic media, electronic storage devices, optical storage devices, etc. The databases can be stored in formats that are accessible by electronic communication devices.

The method described herein can produce reports about a body of water. The method includes receiving data from a monitor on a body of water, the data including positional data and sensed data, relating the positional data and sensed data, sending the data to a remote processing system, and providing a report using the data. In an example, relating positional data and sensed data includes receiving sensed data from a transponder and not controlling the generation of the exciting signal, using a processor correlating the sensed data to time and date data. In an example, sending data includes conditioning data for transmission and wirelessly communicating the data to the remote processing system. In an example, receiving data includes sensing bidirectional data to and from a transponder such that the bidirectional signal remains in a condition usable for its intended purpose. In an example, providing a report includes limiting access to some of the data to the user who caused the data to be sensed. In an example, providing the report includes sending the report over an electronic network.

Figure 5:
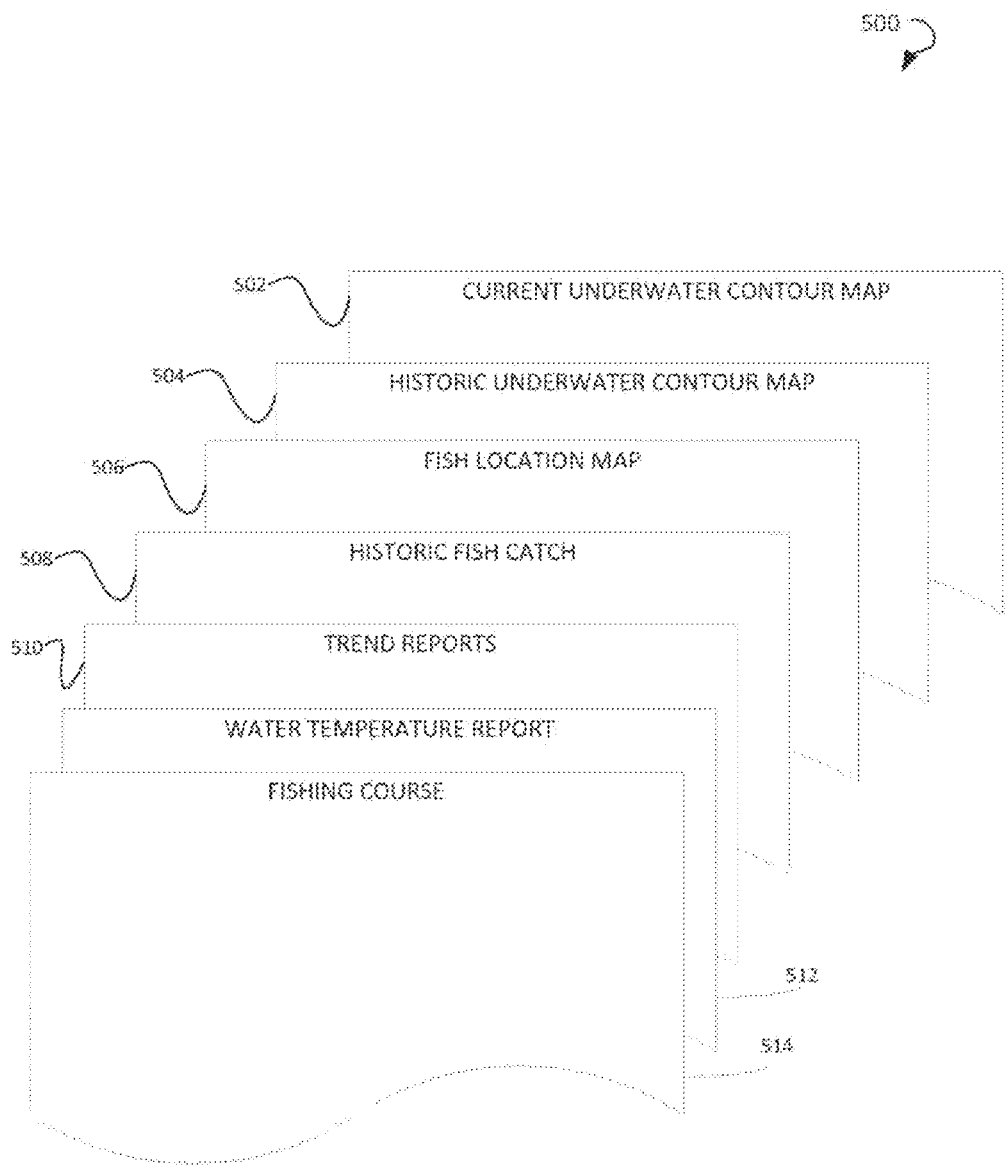
FIG. 5 is a block diagram showing reports that can be generated according to systems and methods of various embodiments of the invention.

FIG. 5 is a schematic view 500 of reports (e.g., 182) that can be created using the methods and systems as described herein. Each of the illustrated reports 502-512 can be produced, formatted, transmitted, and displayed electronically. A current underwater contour map 502 provides the user with a current underwater map of a select body of water. Overlays to map 502 can include weed growth, bottom composition, species in the body of water, sunlight penetration, water clarity, water temperature, oxygen level, etc. Overlays are additional data that can appear on a given report. If a report is interactive and displays data electronically, the individual displays can be selectively activated and displayed at a user's command. A historic underwater contour map 504 can provide the same data as the map 502 but at a different time. A fish location map 506 provides the user with the sensed location of fish. Map 506 can be for a specific time period or by specific species of fish. Additional data that can be used in map 506 is any data related to the fish location, includes area, cloud cover, weather, time, date, temperature, etc. Historic fish catch report 508 provides a user with historical reports that can be modified according to any related data. Trend reports 510 provide the user with reports based on any of the stored data. These reports may be of use to academics as well as anglers. A water temperature report 512 is an example of a further report based on sensed data.

A fishing course report is shown at 514. The fishing course report can be based on historic fishing data for a given body of water. The report can be produced by an electronic computing system or machine using the data sensed in a particular body of water. In an example, professional outdoor guides can use the present device to provide data that is used to create a fishing course. The fishing course can be based on the day of the year, the time of day, the weather conditions, the type of fish, or any other data described herein. A fishing course report could be purchased by a user after it is produced by outdoor guide. In an example, the guide provides the report and allows it to be sold through a website hosted on a server that can also produce the reports.

Figure 6:
FIG. 6 is a block diagram showing a system according to an example embodiment.

FIG. 6 is a block diagram of a monitoring system 600 according to an example embodiment of the present invention. A watercraft 120 is to sail on a body of water and includes an on-board echo-location device 610. Examples of echo-location devices are described in U.S. Pat. Nos. 3,752,431; 4,047,147; 4,281,404; 4,282,590; 4,829,493; 4,995,010; 6,222,449; 7,161,872; and 7,236,426, which are each incorporated by reference for any purpose. If any of these documents conflict with the present description, the present description controls interpretation.

The echo-location device 610 of an example of the present disclosure includes a main unit 612, a power source 614, and a transmitter/receiver 615. The power source 614 powers the main unit 612 and the transmitter/receiver 615. The power source 614 can be a battery or can be a power generator onboard the watercraft 120. The main unit 612 includes electronics and a visual display 617. The display 617 can be a liquid crystal display device, with greater than 2.5-inch diagonal dimension, and can have at least 128 colors, and a resolution of 480×480 pixels. The electronics of the main unit 612 is connected by an electrical conductor 618 to the transmitter/receiver. In an example, the main unit electronics 616 produce a signal that is transmitted by electrical conductor 618 to the transmitter/receiver 615. In an example, the signal has 2,4000-watts peak-to-peak power on 200 kHz or 4,000-watts on a dual frequency. In an example, the transmitter/ receiver 615 is a transducer that converts an electrical signal to an acoustic signal and transmits the acoustic signal into the water. The transmitter/receiver 615 further receives acoustic signals in response to the transmitted signal. The received signals are converted into electrical signals by the transmitter/receiver 615 and sent via the electrical conductor 618 to the main unit 610. The monitoring device 212 is positioned adjacent the electrical conductor 618 and senses the signals passing therethrough. The sensed signals are stored by the monitoring device 212 and sent to the monitoring system processor or to the database 310. When transmitting, electronics of the main unit 612 pulses a signal, e.g. greater than 200 watts and greater than 200 kHz. A transducer is a specific example of a transmitter/receiver 615. As shown, at least part of the transducer 615 is positioned outside the watercraft 120 and in the water. The transducer 615 converts electrical energy into sound and mechanical energy, e.g., movement of the water. The transmitted sound and mechanical energy encounter obstacles in the water and are partially reflected back to the transducer. The wave output by the transmitter/receiver can be ultrasonic and travel through water at approximately 4800 ft (1500 meters) per second. When the sound wave strikes an underwater object, fish or lake bed, part of the sound wave is reflected back towards the transmitter/receiver, in a specific example, the transducer. The depth of the object or the lake bed is determined by calculating the time difference between the initial transmission of a sound wave and the receipt of the reflected sound wave. The result of the reflected sound wave can be converted into a display and shown on the display screen. The transducer 615 received the reflected mechanical energy and converts it into electrical energy, which is then transmitted on conductor 618 to the main unit. The main unit 612 can process and display these electrical pulses on the screen display to shown structure and fish. The monitoring device 212 senses or intercepts these signals between the main unit and the transmitter/receiver 615. In an alternate example, the monitoring device 212 is plugged into the electrical conductor 628, which also extends between the main unit 612 and the transmitter/receiver 615. In an alternate example, the monitoring device 212 is plugged into the electrical conductor 628, which also extends between the main unit 612 and the transmitter/receiver 615. The monitoring device 212 sends data back to the database over communication channel(s) 630, which can include at least one of an electrical connection, the satellite network 140, a cellular network 130, or a computer network. In a further example, the main unit 612 can communicate data to the database 310 over communication channel(s) 640, which can include at least one of an electrical connection, the satellite network 140, a cellular network 130, or a computer network.

In an example, monitoring device 212 is a splitter that operates in the desired frequency range of the echo-location device 610. The splitter can split the signals traveling to and from the main unit 612 and the transponder 615 with minimal, if any loss, between the main unit 612 and the transponder 615. In an example, the ports in the monitoring device 212 match the impedance of the ports of both the main unit 612 and the transponder 615. In an example, the impedance is 50 kOhms. The splitter circuit can include an amplifier to amplify the split signal from the bi-directional signals from the main unit 612 and the transponder 615.

The echo-location device 610, and particularly, the main unit 612 can include machine readable media ports 645, e.g., slots, to receive portable memory devices, such as static media, e.g., magnetic media, electronic media (MMC/SD). These portable memory devices can be loaded with maps and data from the database 310. Such data and maps can be displayed on the display 617 of the main unit 612. In an example, the port 645 is a powered electronic device port, e.g., a universal serial port (USB). The port can power a mobile data device, such as a flash memory drive or stick. The data can be ported to a mobile memory unit, which can then be connected to a reader that sends the data to a processing server.

The main electronics 616 can include a processors and electronic memory to store data. The main electronics 616 can optionally include navigational positioning unit to sense the position of the device and positionally stamp, e.g., store positional data with the sensed data, the data sensed by the monitoring device 212. Accordingly, the position of the device at the time of data detection is known. The position data can be used to plot a course on the body of water based, at least in part, on the variable data detected by the device 120.

A user data input 648 is provided and interacts with the electronics 616 to allow a user to highlight certain data for later input of additional data. In an example, the input 648 is a switch that is activated by a user. In the data the activation of the switch is indicated. The user can access the data and enter additional data at the activation flag in the data.

Data processed by the main electronics and stored in memory can be sampled and digitized to accurately and efficiently process the transponder signals. In an example, analog signals are processed and then digitized at a sufficient sample rate to preserve the information in the signal. The digitized signal is saved as sampled binary file in accordance with the Nyquist Theorem, so that the sonar wave can be recreated using the sampled data, on the present device or at a remote computing device. In an example, it is also desirable to reduce the quantity of redundant data. The positional data can be used to either trigger a data sample, control the sample rate, or to prevent data samples from being taken. In an example, the main electronics 616 prevents creation or storage of data until the position unit indicates that the watercraft has moved at least one meter or more than 1.5 meters. The main electronics 616 can further operate to flag locations where data has already been created and use that prior data using the positional data from the positioning unit. Using some of the above, the memory and the processing can be efficiently used by employing the above functions.

Figure 7:
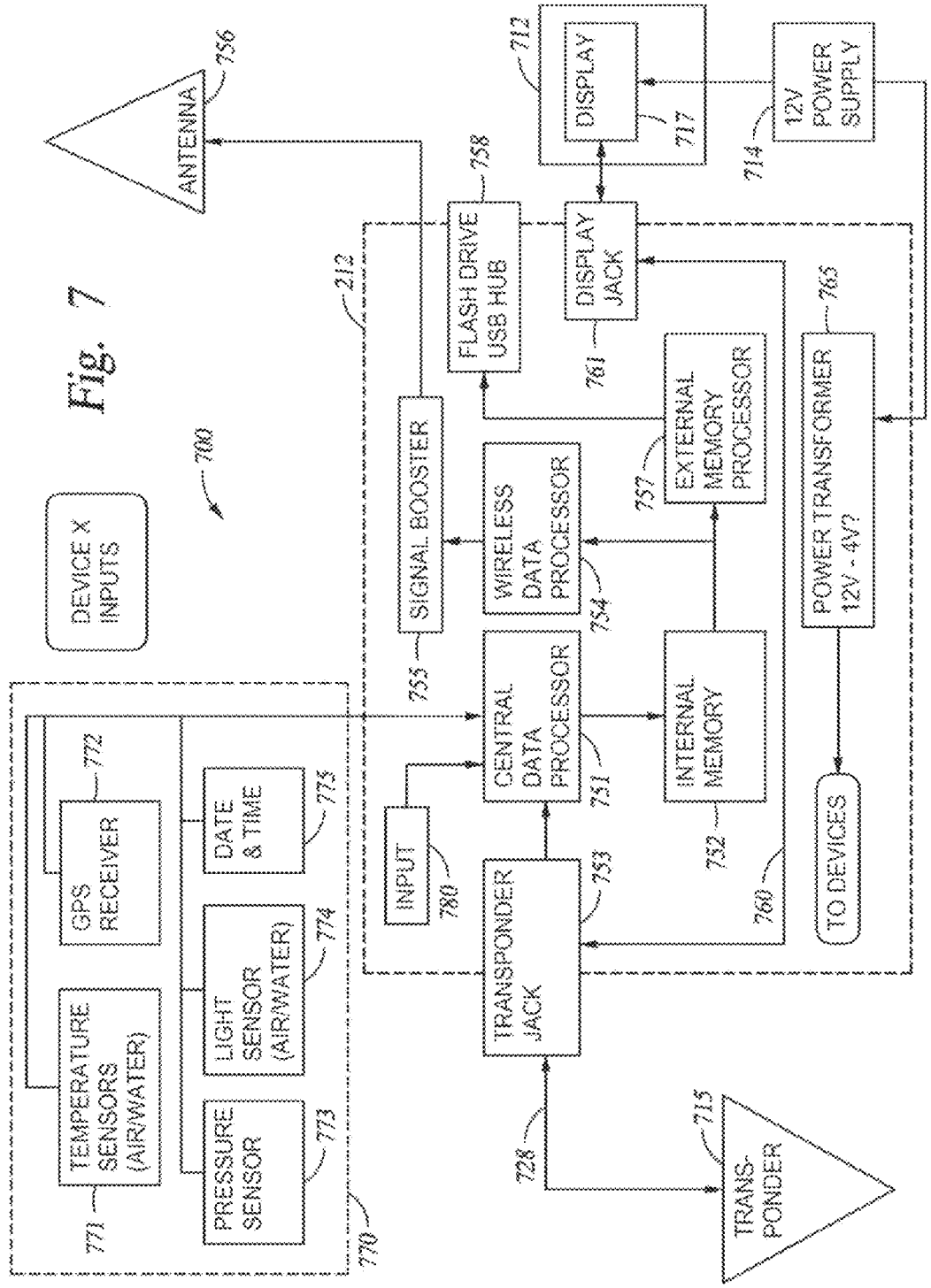
FIG. 7 is a block diagram showing a system according to an example embodiment.

FIG. 7 is a block diagram of a monitoring system 700 according to an example embodiment of the present invention. A monitoring device 212 is positioned between the main unit 717 and the transponder 715. The system 700 can provide electrical communication connections between the main unit 717 and the transponder 715 and other circuitry of the system. In an example, the signals between the main unit 717 and the transponder 715 are not degraded by other circuitry of the system 700. A power supply 714 powers the main unit 712, its display 717 and its electronics (not shown in FIG. 7). The power supply 714 is further connected to a power regulator or transformer 765 to power other related devices, including but not limited to components of the monitoring device 212 and a sensor array 770. Monitoring device 212 includes a transponder jack 753 that electrically communicates to a display jack 761 over an electrical connection 760. Electrical connection 760 can be a wire that has limited loss of signal over its length relative to the frequencies transmitted over its length. The transponder 715 is electrically connected via a conductor 728 (e.g., coaxial cable) to the transponder jack 753. The main unit 712 is electrically connected to the display jack 761. The main unit 712 outputs an electrical signal into a display jack 761, which is transmitted over connection 760 to the transponder jack 753. The signal is then transmitted over conductor 728 to the transponder 715. The transponder 715 converts the electrical signal into an acoustic or sound wave and transmits the wave into the water. In an example, the signal is a pulsed signal. In an example, the signal operates at at least 100 kHz. In an example, the signal is greater than 150 kHz. The transponder 715 received a reflected signal from the water and sends it back to the main unit 712 over the transponder jack 753, connection 760, and display jack 761. The main unit 712 can display the returned signal on the display 717.

Monitoring device 212 includes a transponder jack 753 that has a plurality of connections, here three connections. The first and second connections a bidirectional connects that connect the main unit 712 with the transponder 715 for bidirectional communication. The third connection is an output only connection that is connected to other components of the monitoring device to sense the signals be transmitted by the main unit 712 and the transponder 715. The third connection is a tap that allows the monitoring device 212 to sense the signals being passed between the main unit 712 and transponder 715. The third connection is essentially lossless to the signals being passed at the first and second connections. The signal from the third connection is passed to a central data processor 751. The processor 751 can correlate this signal with other signals and data. The processor 751 can further determine the types of processing needed, for example signal amplification. Processor 751 can further act an analog to digital converter and output digital signals to an internal memory 752. The internal memory 752 can be dynamic memory, static memory, a hard drive, solid state memory, flash memory, etc. Internal memory 752 stores the data relating to the signal tapped at the transponder jack 753. Internal memory 752 outputs the data to at least one of a wireless data processor 754 or an external memory processor 757. The internal memory 752 further stores an identification code that uniquely identifies the monitoring device 212. The identification code can be sent at the beginning of each data download or send from the monitoring device 212. This uniquely identities the data to a specific device and user. Some of the data, e.g., fish location, fish catch, types of fish, travel route, other personal data, etc. is then only accessible by the user. Some data, e.g., the contour of the floor of the body of water, obstacles in the water, vegetation in the water, can be available to other users. The wireless data processor 754 can be a satellite system device or a cellular device or any other wireless signal processor. Data processor 754 converts the data to a form for broadcast. A signal booster 755 receives the broadcast formatted data from the data processor 754 and broadcasts the data over an antenna 756. Signal booster 755 and antenna 756 are both configured for the format of the broadcast, e.g., satellite or cellular or other IEEE standards, etc.

Data can also be retrieved from the monitoring device 212 by direct connection to memory devices, wired computer communication, or plug-in broadcast devices, e.g., a cellular telephone. External memory processor 757 can receive data from the internal memory 752. Processor 757 formats the data for output over a connection 758. In an example, connection 758 is a USB port (1.0 or 2.0), serial port, firewire port, etc. As a result monitoring system 212 has a plurality of communication means to download the data to external computing systems.

A sensor array 770 is connected to the monitoring device 212. The sensor array 770 can sense various characteristics around the watercraft and send the data to the monitoring system 212, which in turn can send the sensed data to the monitoring system processor and monitoring system database (e.g., 310 and not shown in FIG. 7). In an example, a further jack is provided on the monitoring device 212 whereat the sensor array 770 plugs into the monitoring device 212. The sensor array 770 can include a temperature sensor 771. The temperature sensor 771 can sense at least one of the air temperature and the water temperature. A navigational positioning sensor 772 senses the position of the watercraft. Sensor 772 can sense the signals from at least one of the navigational systems including a global navigation satellite system (GNSS) such as Global Positioning System (GPS), Beidou, COMPASS, Galileo, GLONASS, Indian Regional Navigational Satellite System (IRNSS), or QZSS. The sensor 772 can further use Real Time Kinematic (RTK) satellite navigation to provide the real-time corrections of the positioning signal down to a centimeter level of accuracy. The GPS sensor is a receiver that receives differential correction signals in North American from the FAA's WAAS satellites. A pressure sensor 773 can sense the barometric pressure. A light sensor 774 can sense at least one of the light conditions of the air or the water. A data and time device 775 can provide accurate date and time information. Any of this data can be correlated with the transponder data by the central data processor 751 of the monitoring device 212.

Figure 8:
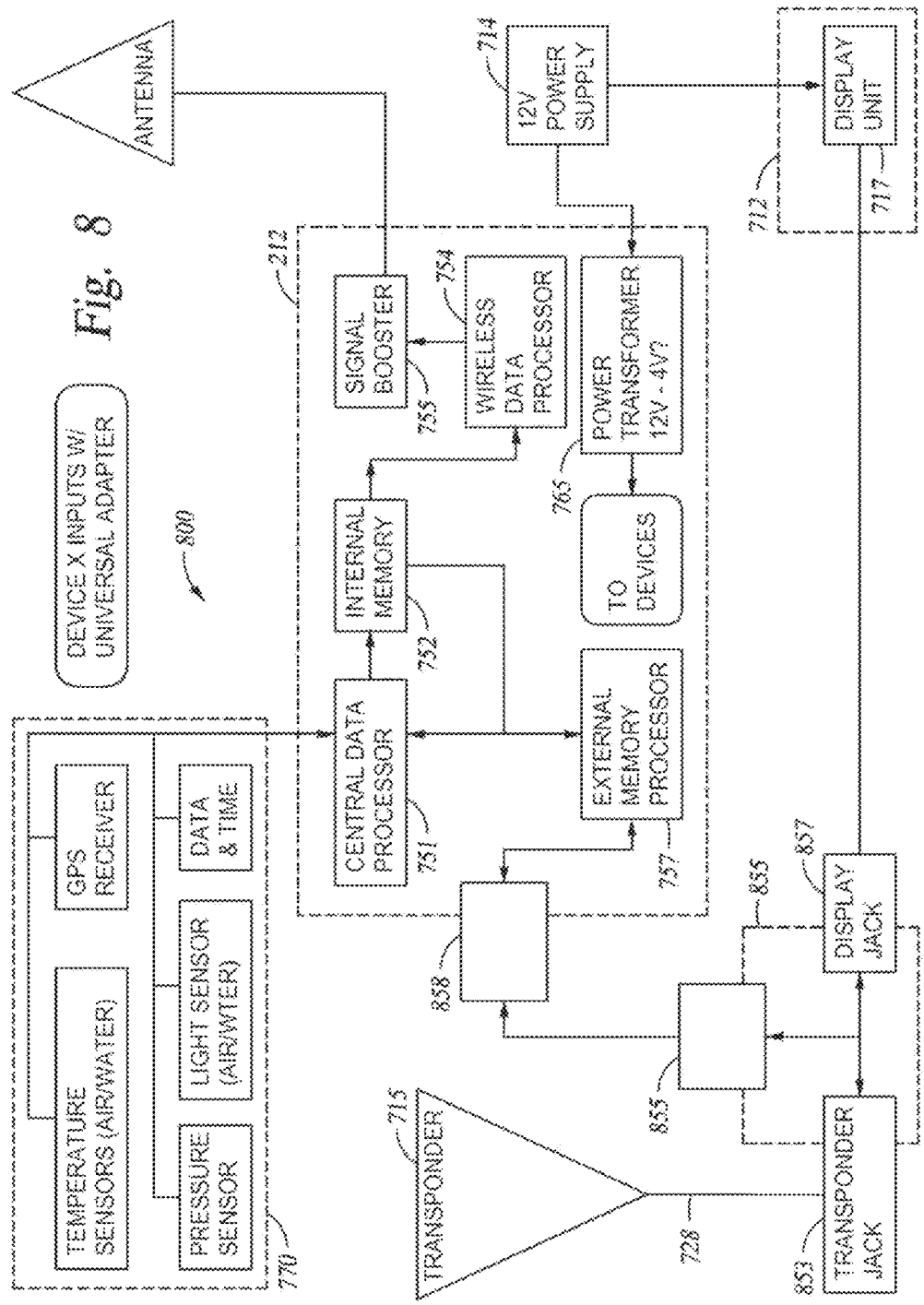
FIG. 8 is a block diagram showing a system according to an example embodiment.

The device 212 can include a user input 780. The user input allows a user to highlight or flag a certain event in the data that is being stored in the device 212 for later download to a remote electronic processing system. The user input can be single tactical response device engagable by the user. The user input 781 can be a switch or button that can be activated by the user, e.g., the fisherman, at the device 212. A flag or other indicator is stored in the data. The user can later access the data and additional data to the stored data. In a further example, the input is a fishing logging device, e.g., the device described in US Patent publication no. 2004/0249860. The input device collect data from the user, e.g., fish caught data, fish type data, number of fish caught data, environment data, e.g., cloud cover, number of boats nearby, activity of the body of water, etc. and store this data with the automatically sensed data. FIG. 8 is a block diagram of a monitoring system 800 according to an example embodiment of the present invention. System 800 is similar to system 700; and like devices are identified with like reference numbers. Some detail relating to the like devices is not repeated for clarity. System 800 includes an external connector 850 that connects the transponder 715 to the main unit 712. Connector 850 is a universal adapter that is external to the monitoring device 212. Connector 850 includes three connections 853, 855, and 857. The first and second connections 853, 857 are bidirectional and connect the main unit 712 with the transponder 715. The third connection 855 is an output only connection that is connected to an input 858 of the monitoring device 212. The input 858 inputs the data to at least one of the central data processor 751 or the external memory processor 757. Thus the monitoring device 212 via the connector 850 and input 858 received the signals passing through the connector 850 to and from the main unit 712 and transponder 715. In an example, the third connection 855 is essentially lossless to the signals being passed at the first and second connections 853, 857. The connection 855 and the input 858 can be USB ports (1.0 or 2.0), serial ports, firewire ports, etc.

The central data processor 751 and the external memory processor 757 communicate data with each other to share the processing load. Each can also access the internal memory 752.

In an example, the connector 850 includes memory that can store the signal for output on the third connection 855.

The transponder described herein is usually referred to as a singular device. It should be recognized that the multiple transponders can be used if they are operating on different frequencies. Moreover, the transmitting and receiving parts of the transponder can be separate components. Multiple transponders can provide multiple angles or multiple views. A transponder typically has a single beam cone that measures 14 degrees at −3 dB. Transponders can operate within a +/− range of about 2 kHz of their set operating frequency. In an example, a transponder operating at a frequency of 192 kHz will have a range from about 190 kHz to about 194 kHz. A 200 kHz transponder will have a range from about 198 kHz to about 202 kHz. Some transponders can operate in a +/− range of 6 kHz. At least one of the transponders operates in the 50 kHz to 200 kHz range.

Figure 9:
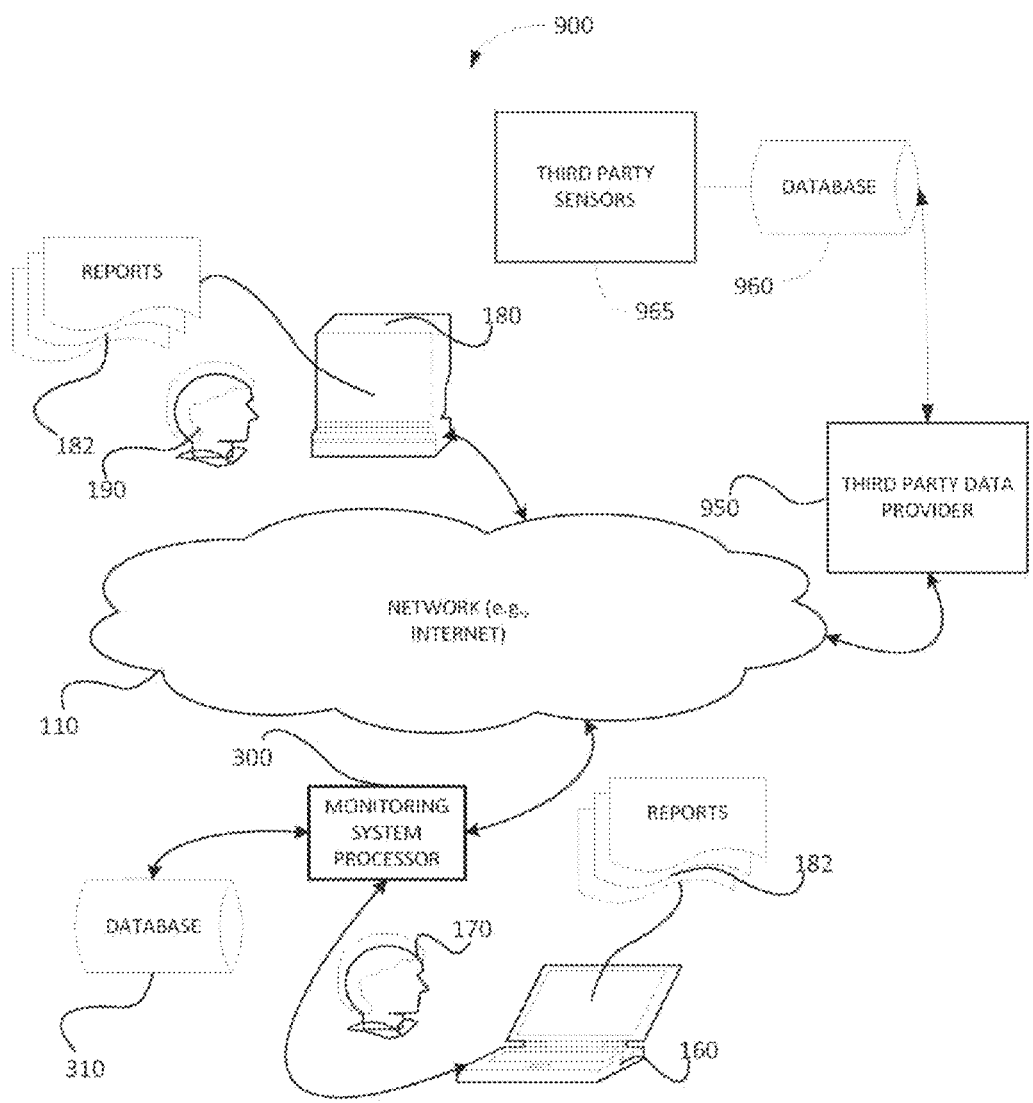
FIG. 9 is a block diagram showing architecture within which information reporting is implemented, in accordance with an example embodiment of the present invention.

FIG. 9 illustrates an example system 900, within which information reporting can be implemented. As shown in FIG. 9, the operating system 900 is similar to the system of FIG. 1 and like elements use the same reference characters, which will not be described in detail here but have the same characteristics and features as shown in FIG. 1 and its description. A third party data provider 950 can provide data to the monitoring system processor 300, for example, through the network 110 or by loading data via computer connections. The third party data provider 950 is connected to a database 960 that stores its data. Third party sensors 965 sense the data. An example of third party data is data from the Army Corp of Engineers. Further examples of third party data include Federal and state watershed databases that store data related to rivers, creeks, streams, wetlands, and lakes and can include data relating to herbicides, chemicals from houses and cars, fecal coliform and other pollutants swept in by rainfall. Animal and fish population data can also be accessed from third party databases. Data can also include depth and flow of the water, water turbidity, temperature, salinity, pH, nitrate level, oxygen level, and mercury level. This third party data can be integrated into the data stored at the database 310 by the monitoring system processor 300. As a result more robust reports 182 with additional data and relationships can be provided to the user.

Using system 100 or 900, the users at computers 160, 180 or at processor 300 can select the layers of data that they would like in a report. The layers can be any type of data that is described herein. The layers can include all of the data for a particular trip or water body. However, only the layer of the data selected is shown in a report 182. The other data may be present in an electronic file but is not displayed on reports 182.

Figure 10:
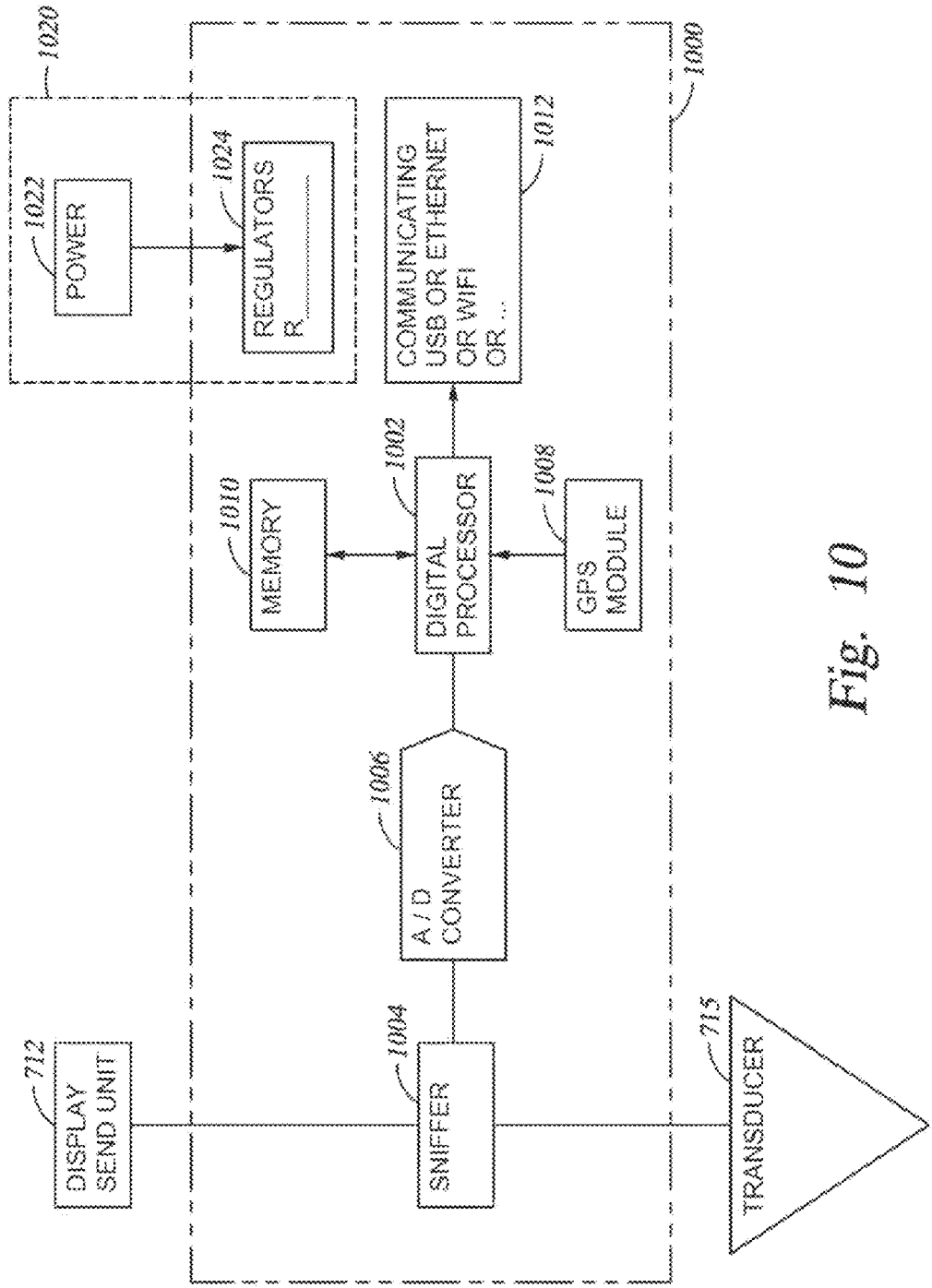
FIG. 10 is a block diagram showing a system according to an example embodiment.

FIG. 10 shows a further system 1000 that senses the data between a display/send unit 712 and transducer 715 of an echo location device. A digital processor 1002 is provided to control operation of the system 100 and process the data signal. Processor 1002 executes stored instructions on circuitry to perform its tasks. A sensing circuit 1004 is provided adjacent the communication path between the display/send unit 712 and the transducer 715 of an echo location device. In an example, the sensing circuit 1004 receives a first electrical signal connection from the display/send unit 712 and a second electrical signal connection from the transducer 715. The sensing circuit 1004 can pass the signals between the unit 712 and transducer with very small loss so that there is no apparent degradation of the signals passing between the two. In an example, the circuit 1004 is a sniffing circuit that non-invasively detects the signals passing between the display/send unit 712 and the transducer 715. The signals being sensed are typically analog. An analog-to-digital converter 1006 converts the signal, radio frequency, to a representative digital signal. The digital signal is fed to the processor 1002. The processor 1002 further receives positional data from the positioning module 1008, which can be a Global Positioning System (GPS) device. Processor 1002 correlates this data and stores it in memory 1010. Processor 1002 can trigger samples of the transducer signal using the functions described herein. For example, data storage, creation, sample rate can be performed based on control signals the positioning module 1008. When appropriate and available, the data stored in memory or being produced by the processor 1002 is output through the input/output module 1012. A power module 1020 is part of the system 1000. Power module 1020 can include a power source 1022, e.g., battery, boat power source, transformer, household AC, 12 volt source, etc. A regulator module 1024 receives power from the power source 1022 and conditions or regulates the power to the other parts of the system 1000.

The processor 1002 and/or the positioning module 1008 can execute control instructions to select when the positioning data is taken and stored in the memory 1010. In one implementation, positioning data is taken at a select interval. In an implementation, the positioning data is only stored once the position changes. If no position data is provided with data, then the prior stored position is assumed to be the current position, The processor 1002 and/or the positioning module 1008 can execute control instructions to determine when other readings can be taken. In one example, a change in the positioning coordinates as determined by the positioning module 1008 will trigger a depth reading. Other water or weather data can also be triggered based at least in part on a change in coordinates. A change in coordinates can be set so that a change in the position based on a foot or a plurality of feet will trigger a reading. In an example, a change in position of about 1.5 meters will trigger a reading and a data save function. In an example, a change of tens of feet are required. In an example, the position change required to trigger a reading is set to be the same as the range chosen for a given report.

Data, processed by the processor 1002 in memory 1010, can be sampled and digitized to accurately and efficiently process the transponder signals. In an example, analog signals are processed and then digitized at a sufficient sample rate to preserve the information in the analog signal. The digitized signal is saved as sampled binary file in accordance with the Nyquist Theorem, so that the sonar analog wave can be recreated using the sampled data, on the present device or at a remote computing device. In an example, it is also desirable to reduce the quantity of redundant data. The positional data from the positioning module 1008 can be used to either trigger a data sample, control the sample rate, or to prevent data samples from being taken. In an example, the positioning module 1008 can prevents creation or storage of data until it determines that the watercraft has moved at least one meter or more than 1.5 meters. The processing module 1008 can further operate to flag locations where the watercraft has already traveled. Using this flag, the processor 1002 can use data that has already been created for that location. Using some of the above, the memory 1010 and the processing by both the positioning module 1008 and processor 1002 can be efficiently used.

The processor 1002 and/or the positioning module 1008 can execute control instructions to prevent readings from being taken or data being stored in memory. In an example, readings and data storage for certain data is prevented from reading or being stored until the positioning module 1008 determines that the device and, hence, the boat, has moved a specified distance, e.g., feet, meters, yards, etc. In an example, readings are blocked until the device has moved 1.5 meters.

The control of the data collection can save memory space by not duplicating readings that are not necessary. To further control data collection the time of day can be used with the positional data to control data acquisition.

In an example, the communication module 1012 and the power module 1020 can be part of the same port, e.g., using the universal serial bus standard. In this example, the system 1000 only requires a single port, which is desirable when used on watercraft. More specifically, only one port that doubles as the power supply port and the data transfer port to a communication server or portable memory. The single port can connect to a boat power source or a 12V battery, and the regulation module 1024 can dissipate unneeded volts. Using the single port for both power and data additional ports and, hence, inlets into the device, are not needed thereby improving the water resistant nature of the design.

Figure 11:
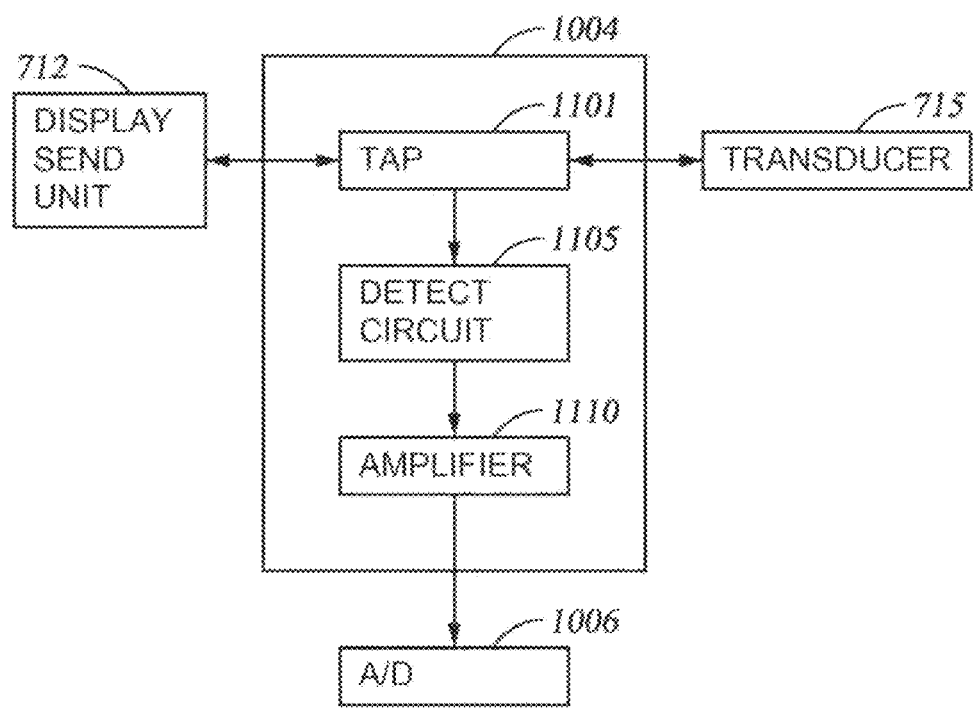
FIG. 11 is a circuit diagram according to an example embodiment.

FIG. 11 is schematic view of the sensing circuit 1004, which is electrically positioned between the display/send unit 712 and the transducer 715. The sensing circuit 1004 includes a tap 1101, a detect circuit 1005, and an amplifier 1110. The sensing circuit 1004 operates to sense the radio frequency signals passing between the display/send unit 712 and the transducer 715. The tap circuit 1101 is connected to complete pass through signal paths between the display/send unit 712 and the transducer 715. The tap circuit 1101 can be a passive attenuation and biasing network circuit. The tap circuit 1101 can further a voltage discharge circuit to dissipate voltages that are too high for the sensing circuit 1004. The tap circuit can further act as a divider circuit with electrostatic discharge devices to protect the sensing circuit 1004. The output from the tap circuit 1101 is sent to the detect circuit 1105. The detect circuit 1105 senses the high frequency transmit signal from the display/sending unit and the return signal from the transducer. The detect circuit 1105 can be a high-speed differential operational-amplifier circuit. The high-speed differential operational-amplifier circuit has sufficient bandwidth so that no data in the tapped signals is lost. In an example, the high-speed differential operational-amplifier circuit operates greater than 1 MHz. In an example, the high-speed differential operational-amplifier circuit operates at greater than 1.5 MHz. The detect circuit 1105 outputs a signal that is received at amplifier 1110. Amplifier 1110 can be an operational amplifier that increases the signal strength to output the signal to the A/D converter 1006. Each of the stages in the sensing circuit 1004 includes components selected to not interfere with the signals communicating between the display/sending unit and the transducer.

Figure 12:
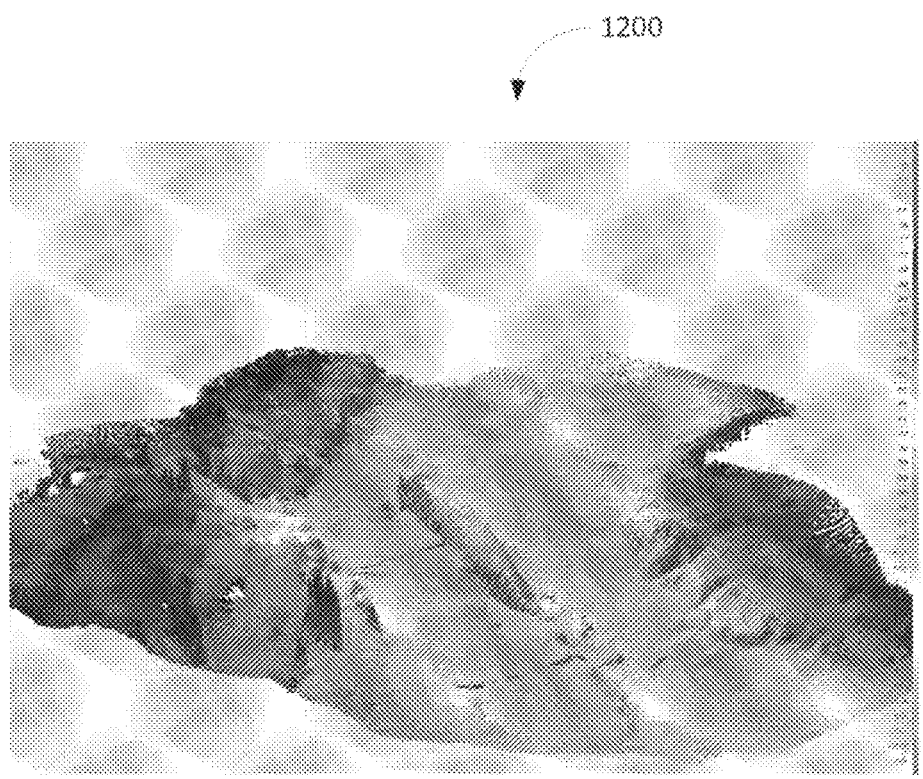
FIG. 12 is a report prepared in accordance with an example embodiment of the present invention.

FIG. 12 is an example of a report 1200 prepared according to the systems, devices, and methods described herein. Report 1200 shows a bottom surface contour map of a body of water. The contour map can be color coded or greyscaled to show various depths. The contour map can be three dimensional. The report 1200 can be displayed on devices 160, 180 (FIG. 1 or 9). The report 1200 can be produced by data sensed on a watercraft and processed by the monitoring system processor 300.

Figure 13A:
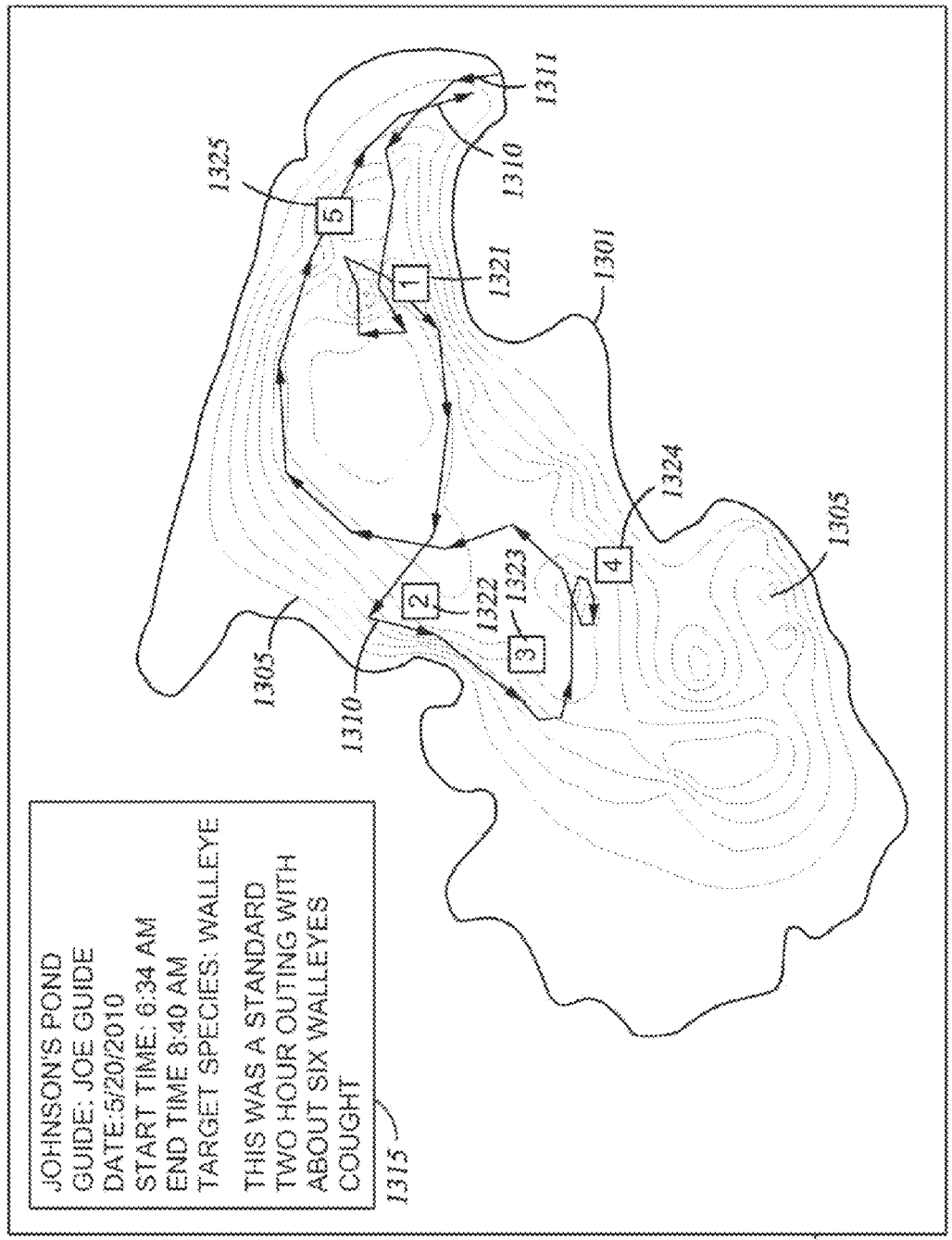
FIGS. 13A and 13B are reports prepared in accordance with an example embodiment of the present invention.

FIG. 13A shows an example report 1300 showing a guide style report. Report 1300 shows the outline of a body of water 1301 with depth markings 1305. In this example the depths at every 4 units (e.g., feet or meters) is shown. Other depth units are within the scope of the present disclosure. The report further includes a travel route that a boat sailed to create the data. The boat can include a device 212 to create or sense the aquatic data from a sonar device or "fish finder." A travel route 1310 is shown on the water body 1301. The trip begins and ends at the boat launch 1311. The arrow heads indicate the direction of travel. Various user highlighted points can be shown (here shown as five). The user highlighted 1321-1325 points can be selected at the sensing device 212 be activating the user highlight input. These highlight points 1321-1325 can refer to a legend at which further data, e.g., text, about these highlights can be provided. The points 1321-1325 can further be comments entered into the report 1300 that can be links to other reports, popup comments or menus. Report 1300 further includes a text box 1315 that can provide a title, user that created the report, date, start time, end time, target species, and other comments that can be entered by report creator or automatically selected by the system.

Figure 13B:
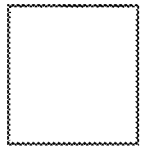

FIG. 13B shows a supplemental report 1350 that can be produced using the systems described herein. The report can further be communicated electronically and shown on display devices. Report 1350 as shown correlates to the report 1300. The report 1350 includes a header that includes a report title block 1352, which can include a title, a location and a date at which location and date the data in the report 1350 was recorded. The target fish can also be included in the title block 1352. A graphic block 1354 can also be provided and can include promotional images, such as a logo of the creator. A trip summary block 1356 is provided and generally describes the trip, e.g., length of trip, fish caught, weather details or other notes as provided by the creator. Below the trip summary block 1356, are user highlight blocks 1361-1365, which correspond to the highlight points 1321-1325 of report 1300. Each highlight block 1361-1365 includes an indicator of which highlight to which each block corresponds. The indicator can be a numerical indication. The location and date is provided for each block 1361-1365. A note area is also provided for each block 1361-1365. The user, who created the data of the report 1300 or 1350 can enter descriptions of each highlight location. For example, the type of fish caught at the location, interpretation of the fish finder data, human observation of the water, bottom, shoreline, type of fishing style, etc. can also be provided.

The reports 1200, 1300, and 1350 can be processed trips that are physically or electronically published. Such trip reports and other reports can be sold. For example, from a website or via a mobile device application. In an example, users can share or sell their trip reports as guides. The user creates the guide report by logging into the computing system whereat the data is stored. The user can select the data and design a report, e.g., a guide report. Once the user creates, which can be from a template stored on the computing system, the user creates the trip report. In an example, the users that can publish trip reports must be pre-approved, e.g., a licensed fishing or outdoor guide. In an example, the user must explicitly list information about the trip, including, but not limited to, number of reports trips they wish to create and/or sell; targeted species, an overall description, contextualize various areas of the trip, etc.

When trip reports are being prepared for sale as opposed to personal memorials of trips, a price points must be determined for any individual trip report. Various factors can be used and stored as instructions in the computing system to automatically determine report pricing. These instructions can include, but are not limited to, total number of trips for sale by a user, total number of fishing guides on a specific body of water, total number of hours in trip, time of year (e.g., seasonality), time of day covered by report, time of day of sale, moon phases, type of species pursued, number of existing trips left for sale, etc.

Trip reports can include the following features. Waypoints can be highlighted with context from images, sonar data, guide comments, direct GPS location data, etc. Certain waypoints can be suppressed to "hide" proprietary information, such as extremely sensitive fishing locations. Time stamps will be used to indicate the time that each GPS coordinate was matched to the transducer sound data. Time can inform users of the report exactly when the report creator's fishing vessel was in that location or waypoint.

Reports can also show detailed aggregate bottom and structure contours. Instructions executed on the computing system can process and re-process of the same dataset to ensure accuracy and precision of the data and positioning data (GPS). For example, the present data sets can more precisely correlate water body data to position data. As a result, bottom definition becomes more accurate and clear as the coverage, e.g., collected and stored data, of the water body increases. Structure degradation can be reported through use of temporal trend features and managed by planting more cribs/trees/structures. As a result, government agencies can better manage these changes. The reports can be dynamic maps enable users to zoom, view 3D and customize maps. Such dynamic maps can further use essentially real-time data. When using real-time maps or selecting data for creating reports, users, through the computing system, can set the contour intervals at which the report provides meaningful data (e.g., 4' contours or 1" contours) and use the appropriate fill for their vision and interpretation capabilities (some users enjoy simple maps; others enjoy complex maps).

Aggregate data from multiple sources, e.g., multiple users, third party sources, government sources, can be used from all trips that store data in the present system. Example include, but not limited to, temporal trend analysis, time sensitive analysis of the transformation of various structures, e.g., contours, weed beds, marked fish, etc. Such aggregate data can be used to report any major changes to a waterbed's distinct characteristics over time. In an example, the aggregate data can be used to identify at least one of invasive species identification (extensive weed bed expansion or contraction), over use of fertilizers, chemicals or other products used to increase/decrease desired land based flora, over harvesting of fish resources (trending marked fish over time), etc.

The present system can further provide trend data that has heretofore not been available. For example, traffic on each water body can be determined on a temporal basis. Moreover, the traffic data can be indicated on the reports.

Other reports can include water levels of the given water bodies through median, mean and mode analysis of duplicate data records.

The data and reports described herein can be used to pro-active manage a fisheries' resources and government regulations set by natural resources management. This can allow various governmental agencies to more efficiently manage water resources under their jurisdiction by providing improved data and reports so that such an agency has extensive and clear data to ensure proper individual management of fisheries and water bodies.

The data described herein can be various forms of data relating to water bodies and fishing. In an example, a raw sound wave data can be processed to derive various information can be derived from the sound wave data. In an example, dynamic sensitivity settings can be configured during run time processing to determine at least one of composition of the bottom (density of bottom), depth, weeds on bottom, weeds off bottom, structures on bottom, structures off bottom, location of structures, dimensions of structures, fish data, bait fish data, thermocline data, and surface temperature. Locations of objects can be determined using differential positioning data. The processor can further operate on the raw data to derive other data, for example, speed of watercraft, vehicle, and direction of watercraft, vehicle. In memory, each data entity is stored as an individual record in a database to enable a layering functionality of each set of information.

Layering can operate to show on a report many types of information, including but not limited to data location, data type (fish, weed, bottom, and/or other data described herein), data date, data time, data collected by user, etc.

The present devices, systems, and methods can pull or receive data (e.g., 950) from third parties, for example, Continuously Operating Reference Stations (CORS), Trimble™ systems, Farmers' Almanac data, government sources, etc. and correlated this data to each set of uploaded data, known as a trip, in a report 182. External data or third party data can include weather characteristics, e.g., barometric pressure, precipitation, temperature, cloud cover, moon phase, wind speed, wind direction, differential adjustments, Receiver Independent Exchange Format (RINEX) data, forum data, fishing reports, social networking data (e.g., Twitter™, Facebook™, MySpace™, other mapping data. Other water body data can also be used to interpret sensed data or produce meaningful reports. Other water body data includes, but not limited to, population, demographics, max depth, acreage, pressure, water clarity, oxygen level.

At the remote processor level (e.g., at monitoring system processor 300, computer 160, computer 180), the reports 182 can be trip reports that are provided back to the user who gathered the data for customization/interaction and viewing. Customization can include adding photos, custom notes and content to the trip. The user can further use single trip data or aggregate self collected data as desired. The trip data can be shared with others. Users can create reports that aggregate water body data (shared, public and self collected data), including but not limited to, complete bottom composition, complete depth, static hard structures, or other data related to their trip of water body of interest. Reports can also provide temporal water body data, which was analyzed in view of a historical perspective of changes to a particular lake or location through manual or automated detection. Historical data can include, but is not limited to, marked fish, bait fish, weed bed growth or recession, seasonal or invasive species analysis, thermocline, and erosion.

Figure 14:
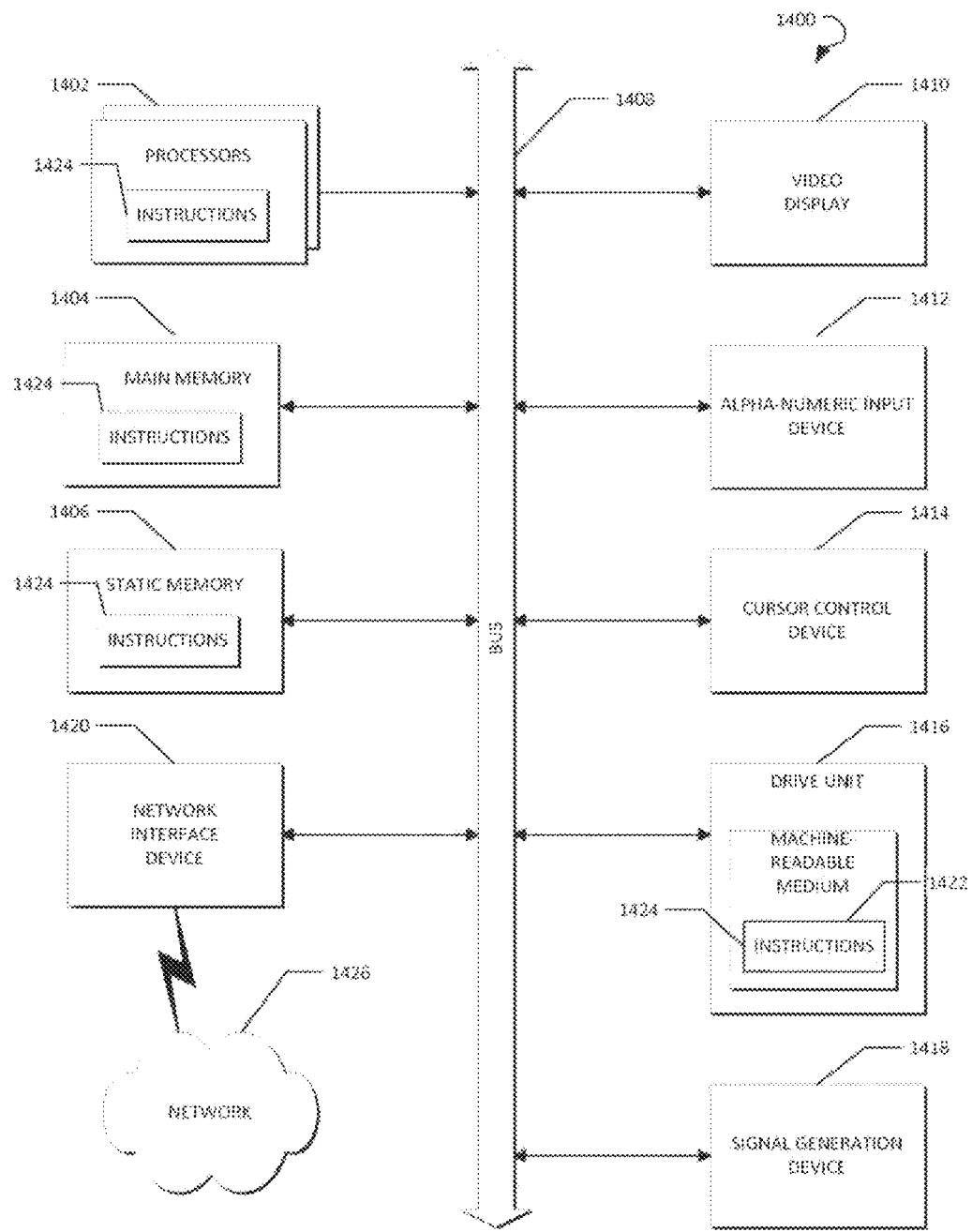
FIG. 14 is a diagrammatic representation of an example machine in the form of a computer system within which a set of instructions for causing the machine to perform any one or more of the methodologies discussed herein.

FIG. 14 shows a diagrammatic representation of a computing device for a machine in the example electronic form of a computer system 1400, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor or multiple processors 1402 (e.g., a central processing unit (CPU), a graphics processing unit (GPU), arithmetic logic unit or all), and a main memory 1404 and a static memory 1406, which communicate with each other via a bus 1408. The computer system 1400 can further include a video display unit 1410 (e.g., a liquid crystal displays (LCD) or a cathode ray tube (CRT)). The computer system 1400 also includes an alphanumeric input device 1412 (e.g., a keyboard), a cursor control device 1414 (e.g., a mouse), a disk drive unit 1416, a signal generation device 1418 (e.g., a speaker) and a network interface device 1420.

The disk drive unit 1416 includes a computer-readable medium 1422 on which is stored one or more sets of instructions and data structures (e.g., instructions 1424) embodying or utilized by any one or more of the methodologies or functions described herein. The instructions 1424 can also reside, completely or at least partially, within the main memory 1404 and/or within the processors 1402 during execution thereof by the computer system 1400. The main memory 1404 and the processors 1402 also constitute machine-readable media.

The instructions 1424 can further be transmitted or received over a network 1426 via the network interface device 1420 utilizing any one of a number of well-known transfer protocols (e.g., Hyper Text Transfer Protocol (HTTP), CAN, Serial, or Modbus).

While the computer-readable medium 1422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and signals that can be read or sensed by a computer. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

While many examples are described above that use a watercraft to source data, it will be recognized within the present invention to source some data from electronic databases, sense data from the ground, sense data from aircraft, sense data from satellites. These other sources of data can be integrated into the database, e.g., database 310. These other sources of data can be analyzed and integrated into watercraft sensed data to improve the reports provided to users. This will increase the robustness of the data and result in greater depth reports.

A fish logging unit can be used on the watercraft 120 and connected to the monitoring system 200. An example of a fish logging unit is described in U.S. Pat. No. 6,222,449, which is incorporated herein by reference for any purpose. However, if the description in U.S. Pat. No. 6,222,449 conflicts with the present disclosure, the present disclosure controls interpretation.

The inventors of the present disclosure identified a need to allow anglers to track every ounce of information that is already feeding into their electronic devices to dramatically improve their learning curve for fishing locations across the country and throughout the world. Over the course of a fishing season or even a day, an angler with systems, devices, and methods described herein will gather more information than if they had a stenographer in the boat. The anglers will discover and save more information about a lake over a few trips out on the water than one would gain in a lifetime of trial and error or a thousand guided trips. Moreover, the data collected can be raw data that can be processed by future algorithms, scientific laws, and statistics or any future trends in data collection and analysis. However, some examples of the present description are used with current technology on watercraft. If devices become more accurate or collect additional data, the present systems and methods can accommodate new trends in the industry.

The systems, methods and devices described herein can provide real time mapping of underwater features of a body of water. This mapping can be provided to the watercraft or other users. It will be appreciated that some embodiments of the present invention do not provide its own display and must rely on displays of other electronic equipment. Such electronic equipment can be remote from the sensing equipment. In an example, a signal interception device transmits the data from a watercraft signal input and sends the signal to systems as described herein. The signal interception device can split a signal from a transponder or a transceiver before it reaches a further electronic signal processing unit. In an example, the signal interception device can be retrofitted on existing equipment. The signal interception device can operate without manual input. The data can be collected, and if needed processed, for display at locations remote from the watercraft.

One use of the presently described systems and methods are monitoring device that is part of a sport fishing system that enables its user to intercept and upload information communicated between a transducer (e.g., an eco sounding device) and the display unit (e.g., a fish finder). The uploaded data will be sent to centralized behavioral, computing, and geo-mapping database, which then processes this data into useful fishing information that will be provided back to the owner of monitoring device. The useful information can be provided through a variety of interactive media. The device can then collect the variable underwater data sensed by the transducer. Underwater data can include, but is not limited to, vegetation, bottom composition and structure, fish, depth, density, and bait fish. Other data can include navigational position data, e.g., longitude and latitude. The device can further accept user input data.

In an example, the monitoring device gathers data received from an existing transducer to track variable underwater data including but not limited to weed beds, bottom composition and structure, fish, depth, density and bait fish. The monitoring device can utilize the data collected to render a frameset of the scrolling interface matched against a navigation position plotted location. The monitoring device will intercept and split the data stream coming from the transducer with a custom component/adapter. In an example, the monitoring device can include an adapter that is agnostic and usable with any transducer/depth finder combination. The monitoring device is easily installed in any fishing boat by inserting between the depth finder and its transducer. Information from the transducer is split at the device where unaffected data is allowed to continue on to the depth finder while the bifurcated data is transmitted via wireless or satellite data communication to the remote servers. The information sent from a user's boat is adapted to existing maps to provide among other features real-time mapping updates, trip tracking, marked fish, and structure updates. All of these features will be coordinated with additional variables collected to provide a log of historical data that will allow a fishing enthusiast to refer to previously collected data for the most accurate information and highest probability of finding fish.

The monitoring device can begin monitoring immediately after it is plugged into the transmission path between the transponder and display device. Accordingly, fishermen can generate their own comprehensive fishing information from a data collection depth finder that already exists in their boats.

An electronic data processing system, such a computer or a server, can receive and store the data. The system can then apply behavioral and geographic interpretation algorithms, e.g., machine executable instructions, on the data. Additional data can also be used in the algorithms to process the stored data. The processed data can be used to provide useful data regarding the body of water associated with the data. Examples of the processed data can be fishing trends or courses for fishing excursions. Users can access their own private data stored on the system. Other users will be able to access reports produced by other users. Reports can be electronic documents that can be displayed on user electronic devices, e.g., mobile phones, tablet computers, netbook computers, fishing displays, etc. The reports can be virtual fishing guides.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The use of the term "or" in the present description should be interpreted as an non-exclusive or unless otherwise stated.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that, for purposes of the United States, the Abstract is provided to comply with 36 C.F.R. §1.62(b) requiring an Abstract that will allow the reader to quickly ascertain the nature and gist of the technical disclosure. It is submitted with the understanding that it will not be used to interpret or limit the scope or meaning of the claims.

We claim:

1. A method of mapping geospatial data, the method comprising:
   receiving positional data, temporal data, sensed data, and manually entered data regarding a body of water from monitoring systems operated by a plurality of users;
   correlating each individual positional datum with each individual temporal datum and each individual sensed datum;
   sampling the positional data to verify that there is a predetermined minimum distance representing watercraft movement between each individual positional datum to eliminate redundant data;
   storing the received data in a database except for the redundant data;
   receiving a request from a first user for a report for the body of water to be generated;
   generating a report that visually represents report data from the database, wherein the report data is based upon stored data received from the first user, data from other users that has been authorized to be shared, and any data set that is automatically available to the first user based on its data type; and
   providing access to the report to the first user;
   wherein the sensed data represents at least one of depth, bottom composition, bottom structure, fish, bait fish, vegetation, thermocline data, and raw return signal data.

2. The method of claim 1, and further comprising:
   receiving third party data from a third party data provider; and adding the third party data to the report data.

3. The method of claim 1, wherein the temporal data comprises a plurality of times with dates.

4. The method of claim 1, and further comprising:
receiving manual data that is entered by the first user; and
adding the manual data to the report data.

5. The method of claim 1, wherein receiving data occurs via wireless transmission from the monitoring system or from a mobile memory device.

6. The method of claim 1, wherein generating the report comprises:
analyzing the report data to create a first layer representing a first data set with a first data type; and
overlaying the first layer on a map.

7. The method of claim 6, and further comprising:
analyzing the report data to create a second layer representing a second data set, the second data set being from a different time than the first data set; and
overlaying the second layer on the map to display a historical trend in the report.

8. The method of claim 7, wherein generating the report comprises:
displaying visually the first layer in the report;
including the second layer in the report but not displaying the second layer visually.

9. The method of claim 6, and further comprising:
analyzing the report data to create a second layer representing a second data type;
storing a second data type as a second layer, the second data type representing a different type of data from the first data type; and
overlaying the second layer on the map to display a plurality of data types in the report.

10. The method of claim 9, wherein generating the report comprises:
displaying visually the first layer in the report;
including the second layer in the report but not displaying the second layer visually.

11. The method of claim 1, wherein providing access to the report to the first user comprises allowing the first user to provide additional text for the report.

12. The method of claim 1, wherein providing access to the report to the first user comprises allowing the first user to select waypoints for the report.

13. The method of claim 1, wherein the received positional data was evaluated and false positional data points were removed from the positional data.

14. A geospatial data processing system comprising:
a data communicating module that receives positional data, temporal data, sensed data and manually entered data from a plurality of monitoring systems, each monitoring system being operated by a user;
a database that stores the received data except for redundant data, wherein the redundant data is determined by sampling the positional data to determine if there is a predetermined minimum distance representing watercraft movement between each individual positional datum;
an analysis performing module that analyzes the data using at least one rule to create report data, the report data being selected from the database as a function of what body of water the data is for; which user the data belongs to, whether the data has been authorized to be shared, and what data type the data represents; and
a report generating module that receives a request for a report and generates the report, wherein the report visually represents the report data;
wherein the sensed data represents at least one of depth, bottom composition, bottom structure, fish, bait fish, vegetation, thermocline data, and raw return signal data.

15. The system of claim 14, wherein the report generating module provides the report to a user that requested the report.

16. The system of claim 15, wherein the user provides additional text for the report.

17. The system of claim 14, wherein the report further comprises:
a first layer that represents a first data set with a first data type, wherein the first layer is overlayed over a map.

18. The system of claim 17, wherein the report further comprises:
a second layer that represents a second data set that is from a different time than the first data set, wherein the second layer is overlayed over the map to display a historical trend in the report.

19. The system of claim 17, wherein the report further comprises:
a second layer that represents a second data type that is different than the first data type, wherein the second layer is overlayed over the map to display a plurality of data types in the report.

* * * * *